(12) United States Patent
Stadali et al.

(10) Patent No.: US 10,057,013 B2
(45) Date of Patent: Aug. 21, 2018

(54) TWO-STAGE SIGNALING FOR TRANSMISSION OF A DATASTREAM

(71) Applicant: Fraunhofer-Gesellschaft zur Foerderung der angewandten Forschung e.V., Munich (DE)

(72) Inventors: Holger Stadali, Nuremberg (DE); Stefan Lipp, Nuremberg (DE); Christian Rohde, Erlangen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 28 days.

(21) Appl. No.: 14/859,679

(22) Filed: Sep. 21, 2015

(65) Prior Publication Data

US 2016/0182189 A1 Jun. 23, 2016

Related U.S. Application Data

(63) Continuation of application No. PCT/EP2014/055532, filed on Mar. 19, 2014.

(30) Foreign Application Priority Data

Mar. 20, 2013 (EP) .................................. 13160229

(51) Int. Cl.
*H04L 1/00* (2006.01)
*H04L 29/06* (2006.01)

(52) U.S. Cl.
CPC .......... *H04L 1/0083* (2013.01); *H04L 1/0003* (2013.01); *H04L 1/0009* (2013.01);
(Continued)

(58) Field of Classification Search
CPC ... H04L 1/0083; H04L 1/0003; H04L 1/0009; H04L 1/0025
See application file for complete search history.

(56) References Cited

U.S. PATENT DOCUMENTS

| 5,677,918 A | 10/1997 | Tran et al. | |
| 6,611,508 B1 * | 8/2003 | Abe | H04W 52/58 370/332 |

(Continued)

FOREIGN PATENT DOCUMENTS

| CN | 101184005 A | 5/2008 |
| CN | 101517935 A | 8/2009 |

(Continued)

OTHER PUBLICATIONS

Office Action dated Dec. 26, 2016 in Russian Patent Application No. 2015144690/08(068818), 11 pages.

(Continued)

*Primary Examiner* — Derrick Ferris
*Assistant Examiner* — Kevin Lee
(74) *Attorney, Agent, or Firm* — Squire Patton Boggs (US) LLP

(57) ABSTRACT

A two-stage signaling concept for a datastream to be transmitted from a transmitter to a receiver is proposed. At the transmitter side, a plurality of frame headers are generated, each frame header including data transmission parameters for payload data. A super-frame header for a super-frame is generated. The super-frame includes a plurality of frames, each frame including one of the frame headers and payload data. The super-frame header indicates a set of super-frame-constant frame header transmission parameters for the frame headers of the plurality of frames of the super-frame. A receiver evaluates the super-frame header of to obtain the super-frame-constant frame header transmission parameters, which are then used to evaluate the plurality of frame (Continued)

headers PLH to retrieve the data transmission parameters. The proposed concept provides added flexibility, less signaling overhead, and/or an option of improved receiver performance at low SNR levels.

12 Claims, 22 Drawing Sheets

(52) U.S. Cl.
CPC .......... *H04L 1/0025* (2013.01); *H04L 1/0029* (2013.01); *H04L 1/0079* (2013.01); *H04L 1/0088* (2013.01); *H04L 69/22* (2013.01)

(56) References Cited

U.S. PATENT DOCUMENTS

| | | | |
|---|---|---|---|
| 2005/0058089 A1* | 3/2005 | Vijayan | H04B 7/12 370/312 |
| 2007/0237144 A1* | 10/2007 | Adhikari | H04L 9/12 370/392 |
| 2009/0129302 A1 | 5/2009 | Pekonen et al. | |
| 2010/0020732 A1* | 1/2010 | Gaddam | H04B 7/2656 370/310 |
| 2012/0044892 A1* | 2/2012 | Guan | H04W 72/121 370/329 |
| 2014/0119389 A1* | 5/2014 | Duan | H04J 3/0623 370/503 |

FOREIGN PATENT DOCUMENTS

| | | |
|---|---|---|
| CN | 101568152 A | 10/2009 |
| EP | 1 126 652 | 8/2001 |
| EP | 1317093 | 6/2003 |
| EP | 1337075 A2 | 8/2003 |
| EP | 2 178 237 | 4/2010 |
| EP | 2178237 A1 | 4/2010 |
| EP | 2 512 054 | 10/2012 |
| GB | 2416963 A | 2/2006 |
| JP | 2012509019 A | 4/2012 |
| JP | 2012209675 A | 10/2012 |
| RU | 2 437 234 | 12/2011 |
| WO | 2008066347 A1 | 6/2008 |
| WO | 2011105093 A2 | 9/2011 |

OTHER PUBLICATIONS

Office Action issued by the Japanese Patent Office dated Sep. 3, 2016 for related JP Patent Appl. No. 2016-503653.
ETSI, European Standard, Digital Video Broadcasting (DVB); Second generation framing structure, channel coding and modulation systems for Broadcasting, Interactive Services, News Gathering and other broadband satellite applications (DVB-S2), Nov. 2011.
ETSI, European Standard, Digital Video Broadcasting (DVB); Second generation framing structure, channel coding and modulation for Satellite Services to Handheld devices (SH) below 3 GHz, Aug. 2011.
ETSI EN 302 755 V1.3.1, Intellectual Property Rights, Apr. 2012.
ETSI, European Standard, Digital Video Broadcasting (DVB); Second generation DVB Interactive Satellite System (DVB-RCS2); Part 2: Lower Layers for Satellite standard, Jan. 2012.
ETSI, Technical Report, Digital Video Broadcasting (DVB); Second Generation DVB Interactive Satellite System (DVB-RCS2); Guidelines for Implementation and Use of LLS: EN 301 545-2, Dec. 2012.
ETSI EN 301 790 V1.5.1, European Standard (Telecommunications series), "Digital Video Broadcasting (DVB); Interaction channel for satellite distribution systems," May 2009.
TM-S2 "Call for technologies (CIT) for Evolutionary subsystems of the S2 system," undated.
"Response to call for technology for DVB-Sx standard," undated.
"Evolutionary DVB-S2 Proposal, Hughes Network Systems," undated.
"Call for Technologies for Evolutionary Subsystems of the S2 system; Operations of DVB-Sx at Very Low SNR by Customer Frames," VT iDirect, Feb. 10, 2013.
"Newtec proposal for DVB-Sx standard; DVBSx_Proposal_Newtec," Wadier, et al., Nov. 2, 2013.
"RAI Reply to TM-S2-0122r1, Call for technologies (CIT) for Evolutionary subsystems of the S2 system," RAI Radiotelevisione Italiana.
Sony Corporation, "Low SNR Link Proposal," Okehie et al., Feb. 11, 2013.
ThalesAlenia Space, Reference: 0005-0001757236, Issue 01, "DVB-Sx Cft," Jan. 8, 2013.
Notice of Decision for Patent dated Aug. 30, 2017 for related Korean Patent Application 10-2015-7030250.
Chinese Office Action issued in corresponding Chinese Patent Application No. 2014800289255 dated Feb. 2, 2018.

* cited by examiner

TWO-STAGE SIGNALING FOR TRANSMISSION OF A DATASTREAM

CROSS-REFERENCE TO RELATED APPLICATIONS

This application is a continuation of copending International Application No. PCT/EP2014/055532, filed Mar. 19, 2014, which is incorporated herein by reference in its entirety, and additionally claims priority from European Application No. EP13160229.4-1851, filed Mar. 20, 2013, which is also incorporated herein by reference in its entirety.

BACKGROUND OF THE INVENTION

The present invention relates to the transmission and reception of data and, in particular, to method for generating and inserting signaling information in a datastream to be transmitted, an apparatus for assembling a datastream, a method for obtaining and exploiting the signaling information in a received datastream, a receiver, and a datastream. Further embodiments of the present invention relate to an efficient two-stage signaling and framing concept for spreading.

The present invention deals with an efficient signaling of specific parameters within any multiplexing scheme. Any multiplexing scheme using FEC coded transmission which can be (but not limited to) reconfigured freely on a codeword-by-codeword basis necessitates signaling attached to each code word.

In signaling schemes of a transmission system like e.g. DVB-S2 (second generation DVB System for satellite broadcasting and unicasting, DVB: Digital Video Broadcasting) with a time-division multiplex (TDM), a physical-layer-header (PLH) of fixed modulation and coding for signaling of information about the subsequent data frame is defined. Since this header is necessitated to be decodable within a wide range of channel conditions, this header is designed to be decodable under specified worst-case-conditions. Commonly, this header is necessitated to be at least as robust as the most robust transmission scheme. This leads to two disadvantages:

In case of good reception conditions, the level of protection is too high, which corresponds to unnecessitated overhead.

Secondly, any extension of the system to work at even worse reception conditions other than originally specified necessitates a redesign of the header, resulting even in an extra overhead as more static redundancy is needed for the header.

SUMMARY

According to an embodiment, a method may have the steps of: generating a plurality of frame headers, each frame header including data transmission parameters for payload data; and generating a super-frame header for a super-frame including a plurality of frames, each frame including one of the frame headers and payload data, wherein the super-frame header indicates a set of super-frame-constant frame header transmission parameters for the frame headers of the plurality of frames of the super-frame, sorting payload data items to a plurality of super-frames having different protection levels depending on a necessitated level of transmission robustness of the payload data item so that each of the plurality of super-frames contains payload data items having the necessitated level of transmission robustness or a lower level of transmission robustness; and selecting the super-frame-constant frame header transmission parameters for the plurality of super-frames on the basis of the necessitated level of transmission robustness for the payload data items contained in the super-frame.

According to another embodiment, an apparatus for assembling a datastream may have: a frame header generator configured to generate a plurality of frame headers, each frame header including data transmission parameters for payload data; a super-frame header generator configured to generate a super-frame header for a super-frame including a plurality of frames, each frame including one of the frame headers and payload data, wherein the super-frame header indicates a set of super-frame-constant frame header transmission parameters for the frame headers of the plurality of frames of the super-frame; a payload sorter configured to sort payload data items to a plurality of super-frames having different protection levels depending on a necessitated level of transmission robustness of the payload data item so that each of the plurality of super-frames contains payload data items having the necessitated level of transmission robustness or a lower level of transmission robustness; and a parameter selector configured to select the super-frame-constant frame header transmission parameters for the plurality of super-frames on the basis of the necessitated level of transmission robustness for the payload data items contained in the super-frame.

According to another embodiment, a method may have the steps of: generating a plurality of frame headers, each frame header including data transmission parameters for payload data; and generating a super-frame header for a super-frame including a plurality of frames, each frame including one of the frame headers and payload data, wherein the super-frame header indicates a frame header format for at least one of the frame headers of the plurality of frames of the super-frame; sorting payload data items to a plurality of super-frames having different protection levels depending on a necessitated level of transmission robustness of the payload data item so that each of the plurality of super-frames contains payload data items having the necessitated level of transmission robustness or a lower level of transmission robustness; and selecting the super-frame-constant frame header transmission parameters for the plurality of super-frames on the basis of the necessitated level of transmission robustness for the payload data items contained in the super-frame.

According to another embodiment, an apparatus for assembling a datastream may have: a frame header generator configured to generate a plurality of frame headers, each frame header including data transmission parameters for payload data; a super-frame header generator configured to generate a super-frame header for a super-frame including a plurality of frames, each frame including one of the frame headers and payload data, wherein the super-frame header indicates a frame header format for at least one of the frame headers of the plurality of frames of the super-frame; a payload sorter configured to sort payload data items to a plurality of super-frames having different protection levels depending on a necessitated level of transmission robustness of the payload data item so that each of the plurality of super-frames contains payload data items having the necessitated level of transmission robustness or a lower level of transmission robustness; and a parameter selector configured to select the super-frame-constant frame header transmission parameters for the plurality of super-frames on the basis of the necessitated level of transmission robustness for the payload data items contained in the super-frame.

The method comprises generating a plurality of frame headers, each frame header comprising data transmission parameters for payload data. The method further comprises generating a super-frame header for a super-frame comprising a plurality of frames, each frame comprising one of the frame headers and payload data. The super-frame header indicates a set of super-frame-constant frame header transmission parameters for the frame headers of the plurality of frames of the super-frame.

The proposed concept provides a super-frame header that indicates the transmission parameters for several frame headers, namely the frame headers occurring within the super-frame. The frame headers belonging to a given super-frame are typically transmitted using the same transmission parameters so that less signaling information needs to be transmitted: The super-frame header provides signaling information not only for one frame, but for several frame headers. On the other hand, the transmission parameters that are used for the frame headers are allowed to vary from one super-frame to another super-frame. The proposed concept makes it possible to adjust the transmission parameters for the frame headers to the transmission parameters that are necessitated for transmitting the data at the desired protection level. This reduces or even avoids the occurrence of situations in which a receiver can decode a frame header but not the corresponding payload data, because the frame header has been transmitted using a default high protection level but the current payload data has been transmitted using a relatively low protection level. Stated differently: higher data redundancy, higher decodability, and/or a higher protection level is provided for a frame header (only) if the corresponding payload data necessitates a similar or corresponding degree of data redundancy, decodability, and/or protection level. In other situations, the protection level of the frame headers can be lowered within the given super-frame, as indicated by the super-frame header.

In contrast to the proposed signaling concept, conventional methods such as DVB-S2 use one header per frame with fixed modulation and code rate for signaling purposes. As a consequence, the design has to take a worst-case scenario into account regarding these parameters, i.e., overhead is caused. Using the novel two-stage signaling approach proposed herein, the overhead is reduced and at the same time the coverable SNR range is enlarged. In contrast to other approaches, valuable flexibility is preserved, in order to be able to respond to the various SNR-requirements of different users/receivers with a single system.

According to embodiments of the present invention, a super-frame spans several frames and the super-frame header indicates the transmission parameters (modulation, code rate, spreading) of several frame headers (typically all frame headers) within the super-frame.

The super-frame may be of constant length (in terms of symbols and capacity units (CUs)) to support the synchronization task of the terminal. Thus, the super frame structure provides the so-called constant framing feature. A super-frame contains several PL-frames with individual protection levels of PLH and XFECFRAME. The start of a PL-frame is not necessarily aligned to the start of the super-frame. However, typically both frame types are multiples of the capacity unit length.

According to an embodiment, an apparatus for assembling a datastream is provided. The apparatus comprises a frame header generator configured to generate a plurality of frame headers, each frame header comprising data transmission parameters for payload data. The apparatus further comprises a super-frame header generator configured to generate a super-frame header for a super-frame. The super-frame comprises a plurality of frames. The super-frame header signals the super-frame configuration. Each frame comprises one of the frame headers and payload data. The super-frame header indicates a set of super-frame-constant frame header transmission parameters for the frame headers of the plurality of frames of the super-frame.

Furthermore, a method for processing a received signal corresponding to a datastream is provided. The method comprises evaluating a super-frame header of a super-frame in the datastream to obtain super-frame-constant frame header transmission parameters. The method also comprises evaluating a plurality of frame headers within the super-frame using the super-frame-constant frame header transmission parameters to obtain data transmission parameters from each frame header for payload data of a corresponding frame. The method further comprises processing the received signal using the data transmission parameters during time intervals corresponding to the payload data to obtain the payload data.

According to a further embodiment, a receiver is provided which comprises a super-frame header evaluator configured to evaluate a super-frame header of a super-frame in a datastream received at the receiver to obtain super-frame-constant frame header transmission parameters. The receiver further comprises a frame header evaluator configured to evaluate a plurality of frame headers within the super-frame using the super-frame-constant frame header transmission parameters to obtain data transmission parameters from each frame header for payload data of a corresponding frame. The receiver also comprises a configurable receiver circuit configured to process the received signal using the data transmission parameters during time intervals corresponding to the payload data to obtain the payload data.

A datastream according to further embodiments comprises a plurality of super-frames. Each super-frame comprises a super-frame header. The datastream further comprises a plurality of frames. Each frame comprises a frame header and payload data. The super-frame header indicates a set of super-frame-constant frame header transmission parameters for the frame headers of the plurality of frames.

BRIEF DESCRIPTION OF THE DRAWINGS

Embodiments of the present invention will be detailed subsequently referring to the appended drawings, in which.

DETAILED DESCRIPTION OF THE INVENTION

In current transmission standards, the conventional signaling schemes of transmission systems are based on a physical-layer-header (PLH) of fixed modulation and coding. This PLH provides signaling of information/parameters of the subsequent data frame: among others, pilots ON/OFF, modulation and code rate of the data frame. The data frame may contain one to several code words. Thus, the length of the PL-frame can vary significantly. The receiver has to decode each PLH successfully to calculate the position of the next PLH, which is called PLH tracking. This becomes a critical issue in case of severe channel conditions like low signal-to-noise ratio (SNR). In the present case, an extension of the SNR-operation range towards lower SNR values is envisaged. Thus, the challenge is to find a robust way to ensure PLH tracking but avoid a huge increase in static overhead, which is especially wasted during better channel conditions. This is further elaborated by the following example of DVB-S2.

Figure 1:
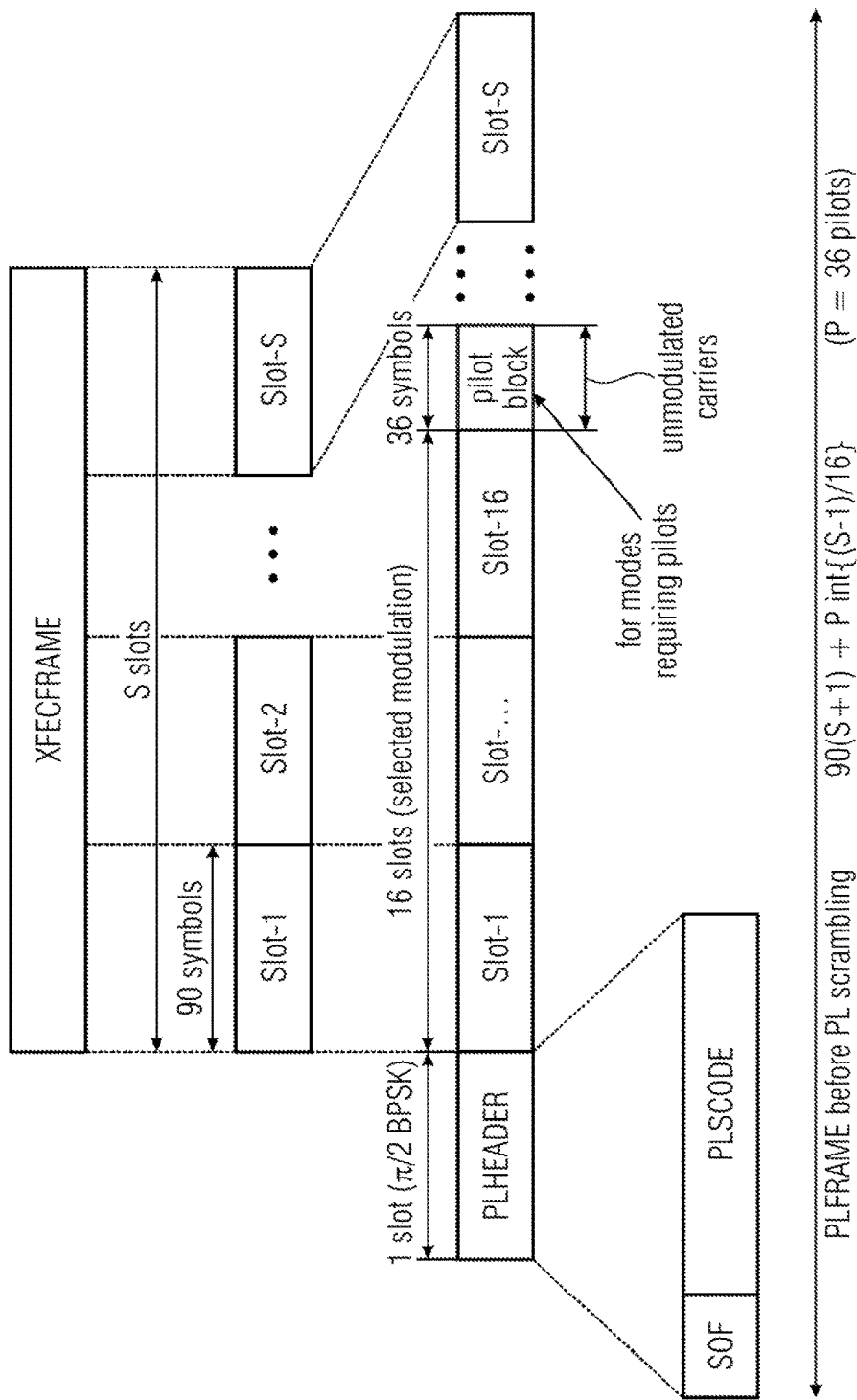
FIG. 1 schematically illustrates a frame structure within DVB-S2.

In DVB-S2 (second generation DVB System for satellite broadcasting and unicasting) [1], the data frame is called XFECFRAME and contains one LDPC (Low Density Parity Check) code word. The PLH, which is set in front of the XFECFRAME as shown in FIG. 1, signals the following parameters of the XFECFRAME: modulation, code rate, short or long code word type, and pilots ON/OFF. Thus, a great variety of different code word lengths are possible. As a specific limitation, the PLH is modulated with the most robust modulation order ($\pi/2$ BPSK) available in DVB-S2. Please note that $\pi/2$ BPSK is not available for data frames in DVB-S2.

FIG. 1 illustrates that a XFECFRAME is sliced into slots Slot-1 to Slot-N of constant length. The number of slots per XFECFRAME is an integer S and depends, inter alia, on a selected modulation scheme and a selected LDPC scheme or code rate. The length of each slot may be, for example, M=90 symbols. A PLHEADER is generated and inserted before the XFECFRAME for receiver configuration. PLHEADER shall occupy exactly one slot (length: M=90 Symbols). For modes necessitating pilots a pilot block is inserted, e.g., every 16 slots, to support the synchronization task of a receiver. The pilot block may be composed of P=36 pilot symbols, as in the example schematically illustrated in FIG. 1. Randomization of the (I, Q) modulated symbols may be performed by means of a physical layer scrambler. By performing the processing schematically illustrated in FIG. 1 the XFECFRAME is converted to a PLFRAME (before PL scrambling). The length of the PLFRAME in symbols is $90(S+1)+P \text{ int}\{(S-1)/16\}$. The first part, i.e. $90(S+1)$, corresponds to the header PLHEADER and the slots. The second part, i.e. $P \text{ int}\{(S-1)/16\}$, corresponds to the pilot blocks, each having 36 symbols, which occur every 16 slots.

The PLH is designed to be decodable under specified worst-case-conditions to be at least as robust as the most robust payload protection (modulation and code rate). For example, the PLH of DVB-S2 is limited to reliable tracking only for SNR$\geq$−3 dB in AWGN channel (Average White Gaussian Noise channel) due to a code rate of 7/64 and modulation $\pi/2$-BPSK. This robustness ensures that a DVB-S2 system in ACM/VCM (Adaptive Coding and Modulation/Variable Coding and Modulation) mode can serve all terminals at different SNRs such that all terminals, which can theoretically be addressed with error-free reception, can track the PLHs of the time-division-multiplex (TDM) of frames. However, the worst-case-specification leads to two disadvantages:

In case of good reception conditions of the terminals, the level of protection is too high, which corresponds to unnecessitated overhead.

Secondly, any extension of the system to work at even worse reception conditions other than originally specified necessitates a redesign of the header. Such a static and robust redesign is equivalent to the straight forward solution. Furthermore, the redesign would result in an extra overhead as described already.

As a consequence, the conventional systems comprise a trade-off between necessitated protection of the PLH and the ability to track the PLHs in ACM/VCM mode on the one hand, and the necessitated overhead on the other hand. In a high data-rate CCM mode, the constant overhead of the PLH is most inefficient in terms of bandwidth efficiency. The invention relaxes these counteracting requirements and increases the waveform flexibility.

Figure 2:
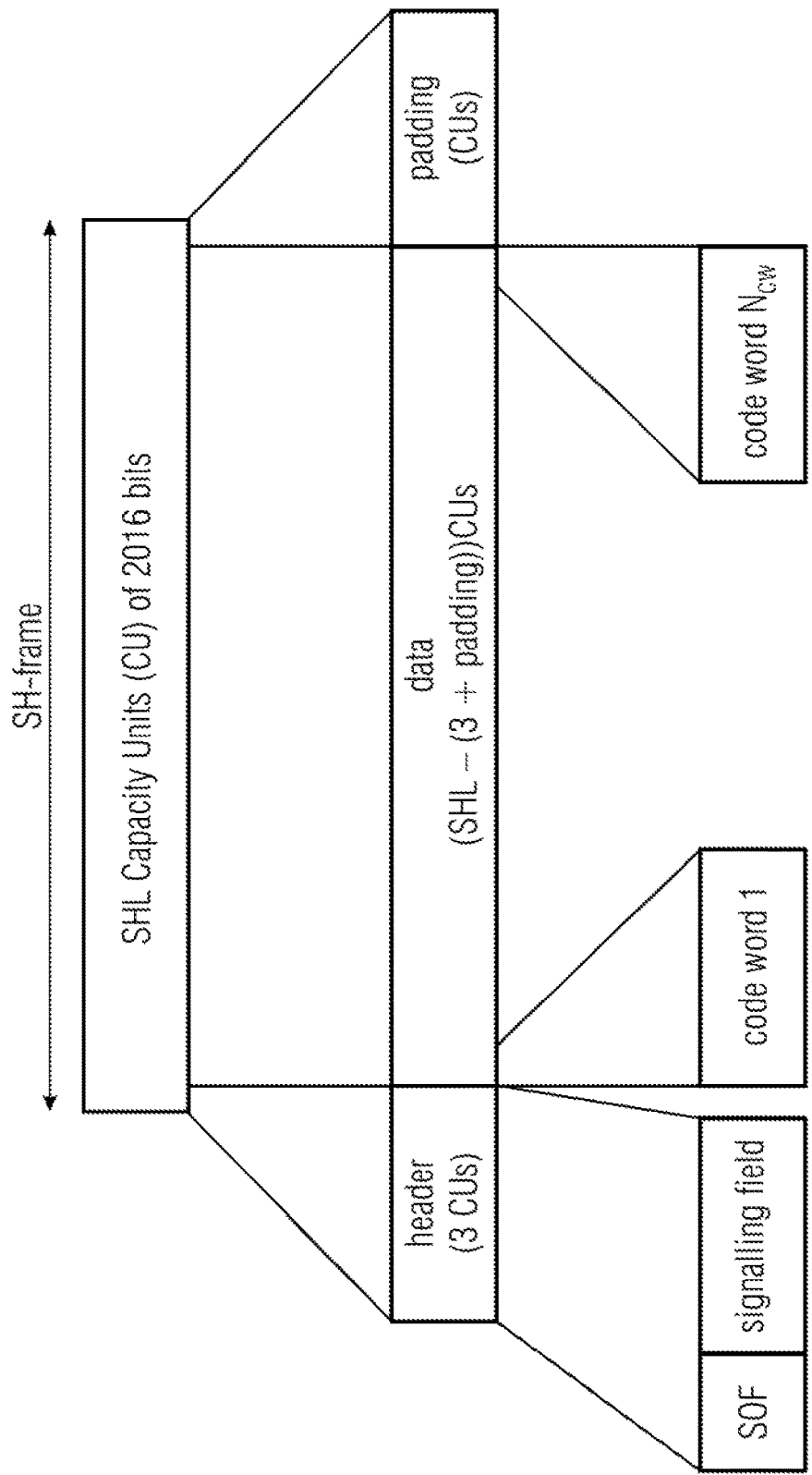
FIG. 2 schematically illustrates a frame structure within DVB-SH TDM-mode.

In the DVB-SH standard (Digital Video Broadcasting—Satellite services to Handhelds) [2], a TDM mode is specified which is organized similarly as in DVB-S2. As shown in FIG. 2, the SH-frame contains a header and New code words plus padding. The header is encoded with a fix code rate of 1/5 and modulation QPSK. Thus, the same trade-off as discussed previously arises from this one-stage signaling concept.

Figure 3:
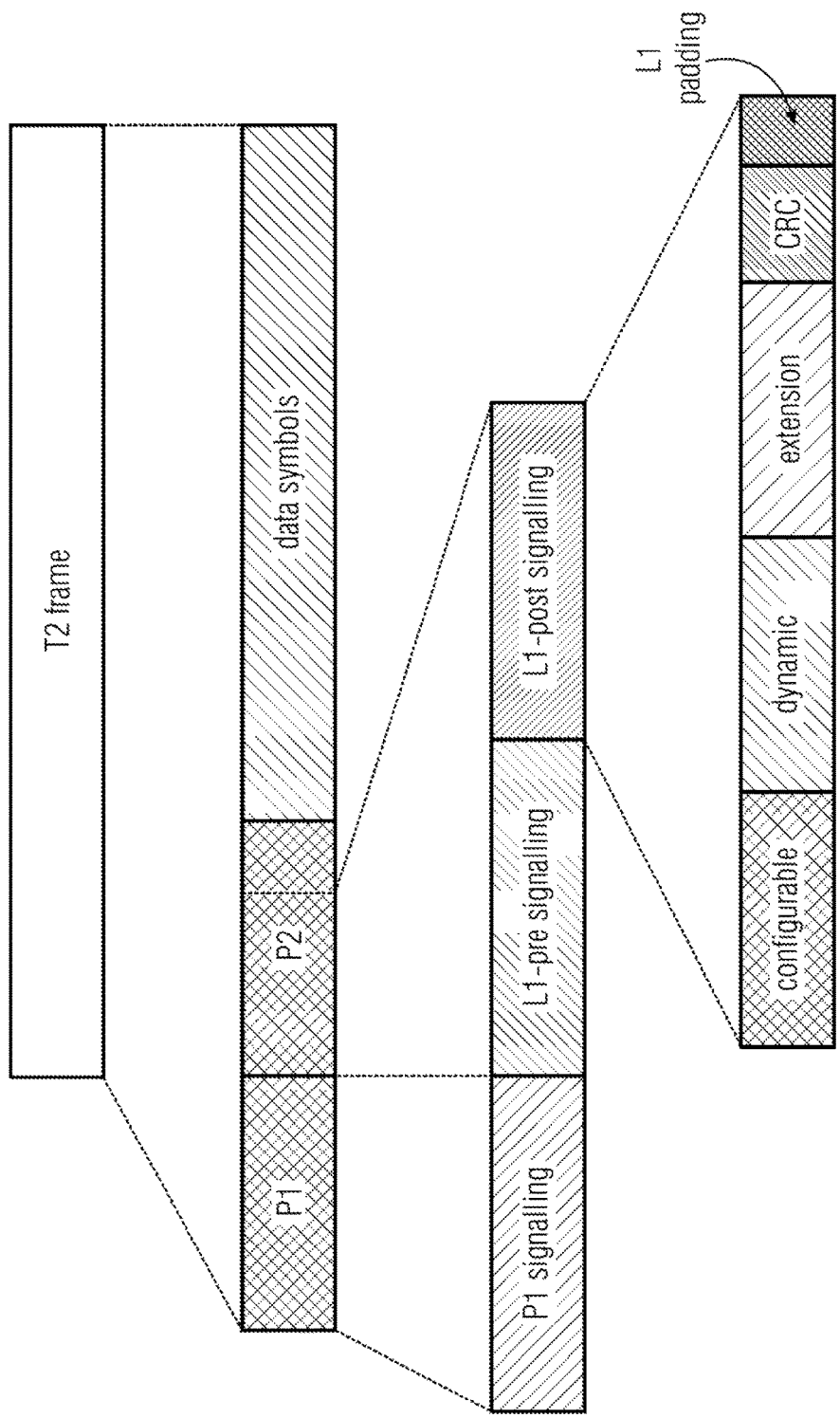
FIG. 3 schematically illustrates a structure of a T2 frame of the DVB-T2 standard.

The DVB-T2 standard (Digital Video Broadcasting—Second Generation Terrestrial) [3] features in total a three-stage signaling as shown in FIG. 3, where the P1 header contains the P1 signaling and the P2 header contains L1-pre and L1-post signaling. Several of these T2 frames represent a super-frame. For a given system bandwidth, FFT-length and Guard-Interval-length, which is commonly fixed in an OFDM-based transmission, the T2 frame has a constant length. The flexibility in DVB-T2 is achieved by multiplexing the data symbols of different streams or services to so-called physical layer pipes. The signaling hierarchy is necessitated due to the huge amount of necessitated signaling information for this OFDM related waveform.

The two-stage-signaling within P2: In L1-pre, modulation and code rate of the consecutive L1-post is signaled, where L1-pre is static during each super-frame and L1-post is dynamic. Both parts, L1-pre and L1-post, are transmitted for each T2-frame but not separate. Thus, no special header tracking is necessitated like in DVB-S2 because of a fixed T2 frame length after selection of the carrier parameters like FFT-length, guard-interval-length, and system bandwidth. The information of P1 and P2 signaling, including the part thereof that is constant during the super-frame, is transmitted several times per super-frame, more particularly once every T2 frame.

Figure 4:
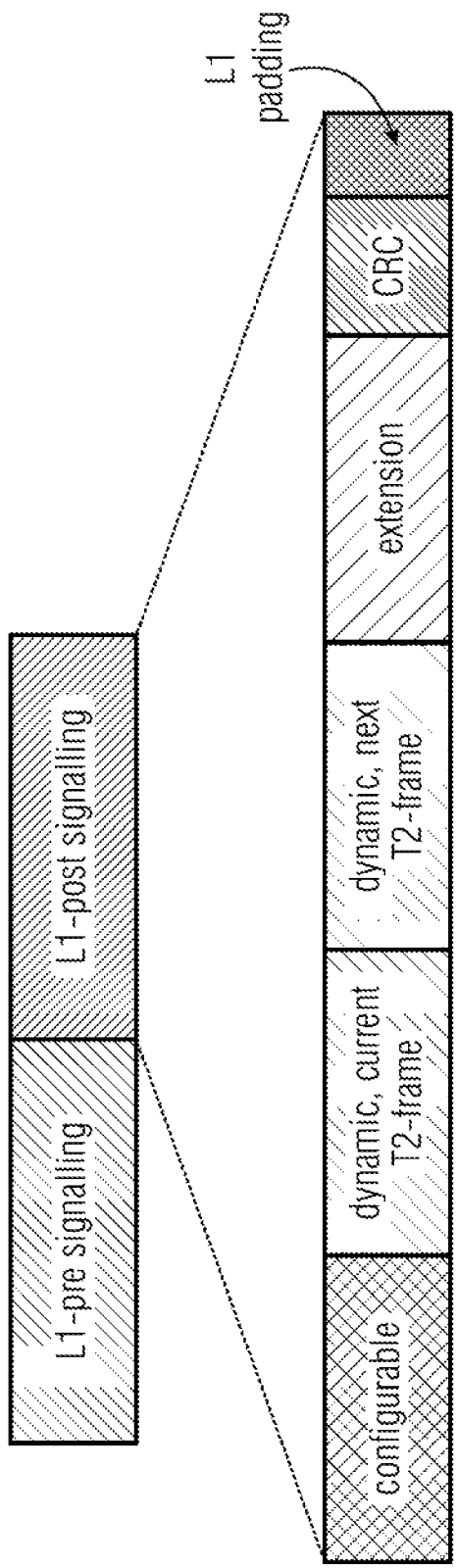
FIG. 4 schematically illustrates optional details of a L1-post signaling field in the T2 frame of FIG. 3.

As DVB-T2 is a terrestrial broadcasting system, there are not such transmit power limitations as in the satellite-based communication. Therefore, no data spreading is foreseen. Although modulation and code rate of the L1-post is signaled by the L1-pre, no spreading of L1-post is foreseen. However, a preannouncement of the L1-post of the following T2-frame can be added to the current L1-post. This kind of repetition is less suitable for real SNR-enhancement, because both L1-post fields are encoded together, as schematically illustrated in FIG. 4. Furthermore, the L1-post is not constant in length, which has to be signaled via the L1-pre.

The DVB-S2 standard [1] as a downlink transmission is reused in DVB-RCS2 (Digital Video Broadcasting—second generation Return Channel via Satellite) [4], which specifies also some extensions to DVB-S2. Even more relevant are the associated DVB-RCS2 implementation guidelines [5], where spreading is considered. One of the two shown spreading options in [5] has been reused from the specification for the provision of the interaction channel for GEO satellite interactive networks with fixed Return Channel Satellite Terminals (RCST) [6]. The two methods are denoted as Direct Sequence Spectrum Spreading (DSSS) and Frame Repetition Spectrum Spreading (FRSS).

In case of DSSS, each symbol of the carrier (i.e. PLH, pilots, and data symbols) is multiplied by a specified sequence, which has the length of the spreading factor (SF). As result, the SNR operation point of the whole carrier multiplex (irrespective of operation in CCM or ACM/VCM) is shifted statically according to the selected SF, which creates again inflexibility and unnecessitated overhead for the terminals in good reception conditions.

The second way of spreading specifies frame-wise repetition, i.e. the PLH is SF-times repeated and the XFEC-FRAME is SF-times repeated. Unfortunately, the transmission is then restricted to pilots OFF and only short code words. Although different protection levels (=modulation+code rate+SF) are signaled by the PLH, a PLH tracking would be possible only for terminals in good reception conditions if a variable SF would be allowed.

For both spreading methods the SF and the spreading type is signaled via the so-called Satellite Forward Link descriptor, which is not directly available at the physical layer. Therefore and due to the previous considerations, the chosen SF has to stay constant for each carrier, which again induces overhead.

In the following description, first some terms and abbreviations are defined and described. Then the super-frame structure and the two-stage signaling concept are described. Further, a multiplexing scheduler is proposed, which exploits the novel signaling concept. The description of the invention is related to an enhancement of the DVB-S2 standard but is in general not limited to it.

Definition of Terms

Figure 5A:
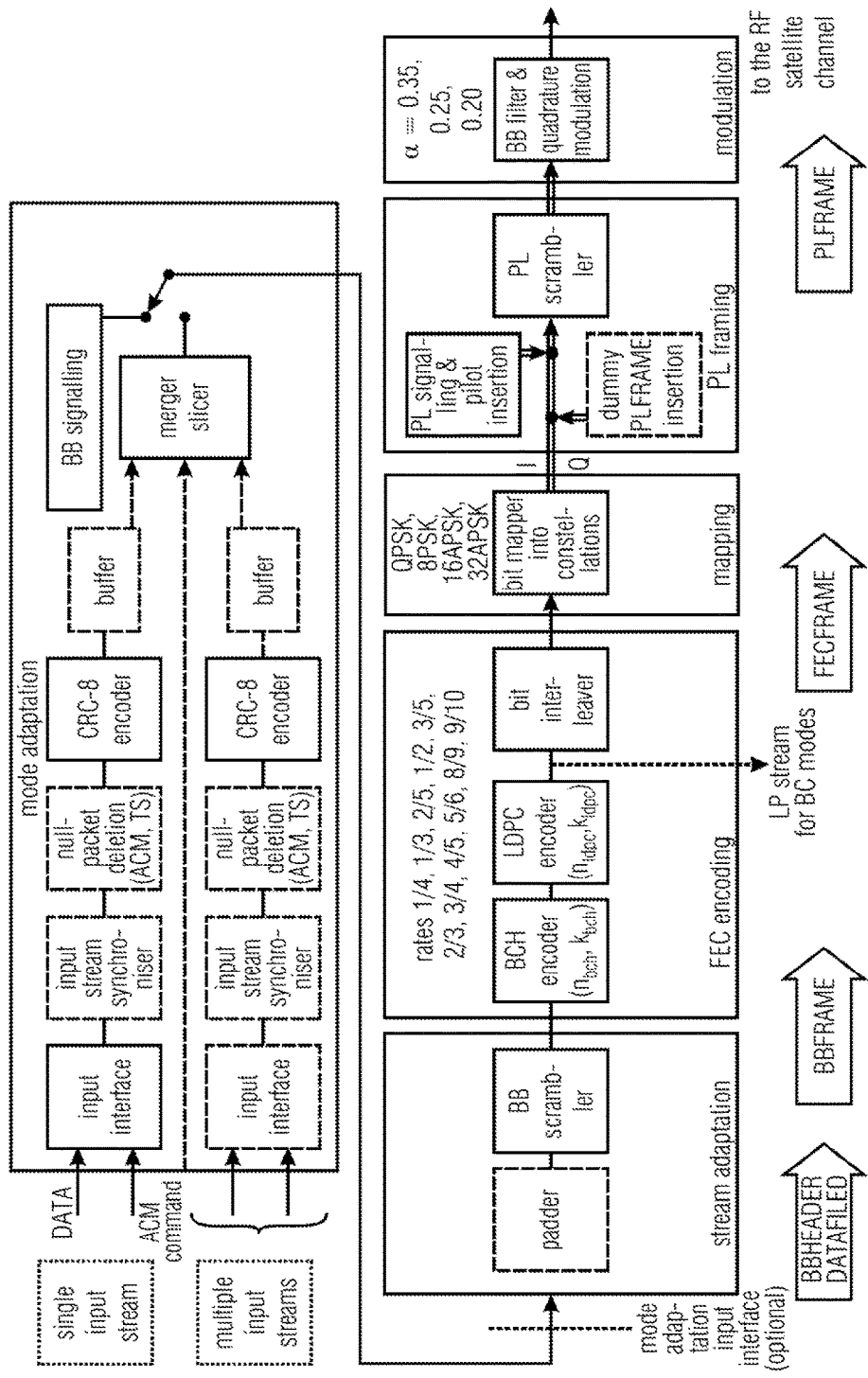
FIG. 5A shows a schematic block diagram of a transmitter structure conform with DVB-S2.

Modulation Any signal constellation of modulation order M, like e.g. M-PSK or M-QAM or M-APSK
Capacity Unit (CU) A group/certain amount of consecutive symbols. In DVB-S2 it is called slot.
Code rate Code rate of any appropriate code, specifying the level of redundancy. One can also consider using different codes for different code rates.
Spreading Repetition with or without weighting by a spreading sequence. Spreading can be accomplished e.g. in time or frequency direction or combined; it can be done on symbol-basis, CU-basis, or code-word-basis.
Protection level A suitable combination of modulation, code rate, and spreading
FECFRAME Encoded binary data frame
XFECFRAME FECFRAME after modulation
PL-frame Physical layer frame consisting of PLH and XFECFRAME
Super-frame Contains several PL-frames Abbreviations ACM Adaptive Coding and Modulation (DVB-S2 mode)
AWGN Additive white Gaussian noise
BB-Frame Baseband-Frame
CCM Constant Coding and Modulation (DVB-S2 mode)
CDM Code-division multiplexing
CfT Call for Technology
CRC Cyclic Redundancy Check
CU Capacity Unit
DVB-S2 Digital Video Broadcasting—Satellite, 2nd generation
DSSS Direct sequence spectrum spreading
FDM Frequency-division multiplexing
FEC Forward error correction
FRSS Frame repetition spectrum spreading
ISI Input stream identifier
LDPC Low-density parity check code
PLH Physical-layer header
PLS Physical Layer Signaling
RFU Reserved for future use
SF Spreading factor
SNR Signal-to-noise ratio
TDM Time-division multiplexing
VCM Variable Coding and Modulation (DVB-S2 mode)
WER Word Error Rate FIG. 5A shows a schematic block diagram of a DVB-S2 conform transmitter structure to provide an overview of a possible application and surrounding system in which embodiments according to the present invention may be employed. The DVB-S2 system is an example only and does not the exclude the option that embodiments of the present invention may be employed in data transmission or broadcasting systems working under a different standard. According to FIG. 5A, a DVB-S2 System (transmitter side) typically comprises a sequence of functional blocks as described below. Sub-systems that are drawn in dotted outline are not relevant for single transport broadcasting applications.

Mode adaptation is typically application dependent. It typically provides input stream interfacing, Input Stream Synchronization (optional), null-packet deletion (for ACM and Transport Stream input format only), CRC-8 coding for error detection at packet level in the receiver (for packetized input streams only), merging of input streams (for Multiple Input Stream modes only) and slicing into DATA FIELDs. For Constant Coding and Modulation (CCM) and single input Transport Stream, Mode Adaptation typically consist of a "transparent" DVB-ASI (DVB Asynchronous Serial Interface) (or DVB-parallel) to logical-bit conversion and CRC-8 coding.

A Base-Band Header is typically appended in front of the Data Field, to notify the receiver of the input stream format and Mode Adaptation type. Note that the MPEG multiplex transport packets may be asynchronously mapped to the Base-Band Frames.

For applications necessitating sophisticated merging policies, in accordance with specific service requirements (e.g. Quality of Service), Mode Adaptation may optionally be performed by a separate device, respecting all the rules of the DVB-S2 specification.

Stream adaptation may be applied to provide padding to complete a Base-Band Frame and Base-Band Scrambling.

Forward Error Correction (FEC) Encoding may be carried out by the concatenation of BCH outer codes and LDPC (Low Density Parity Check) inner codes (rates 1/4, 1/3, 2/5, 1/2, 3/5, 2/3, 3/4, 4/5, 5/6, 8/9, 9/10). Depending on the application area, the FEC coded block shall have length $n_{ldpc}$=64 800 bits or 16 200 bits. When VCM and ACM is used, FEC and modulation mode may be changed in different frames, but remains constant within a frame.

Bit interleaving may be applied to FEC coded bits for 8PSK (8-ary Phase Shift Keying), 16APSK (16-ary Amplitude and Phase Shift Keying) and 32APSK (32-ary Amplitude and Phase Shift Keying).

Mapping into QPSK (Quadrature Phase Shift Keying), 8PSK, 16APSK and 32APSK constellations typically are then applied, depending on the application area.

Gray mapping of constellations shall be used for QPSK and 8PSK.

Physical layer framing is typically applied, synchronous with the FEC frames, to provide Dummy PLFRAME insertion, Physical Layer (PL) Signaling, pilot symbols insertion (optional) and Physical Layer Scrambling for energy dispersal. Dummy PLFRAMEs are transmitted when no useful data is ready to be sent on the channel. The System provides a regular physical layer framing structure, based on SLOTs of M=90 modulated symbols, allowing reliable receiver synchronization on the FEC block structure. A slot is devoted to physical layer signaling, including Start-of-Frame delimitation and transmission mode definition. This mechanism is suitable also for VCM and ACM demodulator setting. Carrier recovery in the receivers may be facilitated by the introduction of a regular raster of pilot symbols (P=36 pilot symbols every 16 SLOTs of 90 symbols), while a pilot-less transmission mode is also available, offering an additional 2.4% useful capacity.

Base-Band Filtering and Quadrature Modulation shall be applied, to shape the signal spectrum (squared-root raised cosine, roll-off factors 0.35 or 0.25 or 0.20) and to generate the RF signal.

In December 2012, the DVB-S2 group published a call-for-technology (CfT) [7], where also solutions for low SNR operation have been addressed. The corresponding responses are discussed in the following.

A proposal [8] made by one of the contributors to the call-for-technology was to merge the two approaches of spreading from DVB-RCS2 [4], [5], [6]: The PLH should be spread frame-wise and XFECFRAME should be spread symbol-wise. π/2-BPSK should be used and scrambling is applied to the spread XFECFRAME, only. The PLH is static spread by factor 4 and the XFECFRAME according to a signaled protection level (=modulation+code rate+SF). The stated reason for this mixture is that the synchronization is too weak to facilitate a coherent combining of whole XFEC-FRAMES. However, the static spreading of the PLH represents again the straight forward way of extending the SNR operation range by the worst-case assumption, which leads to overhead in case of good reception conditions when using ACM/VCM.

Figure 5B:
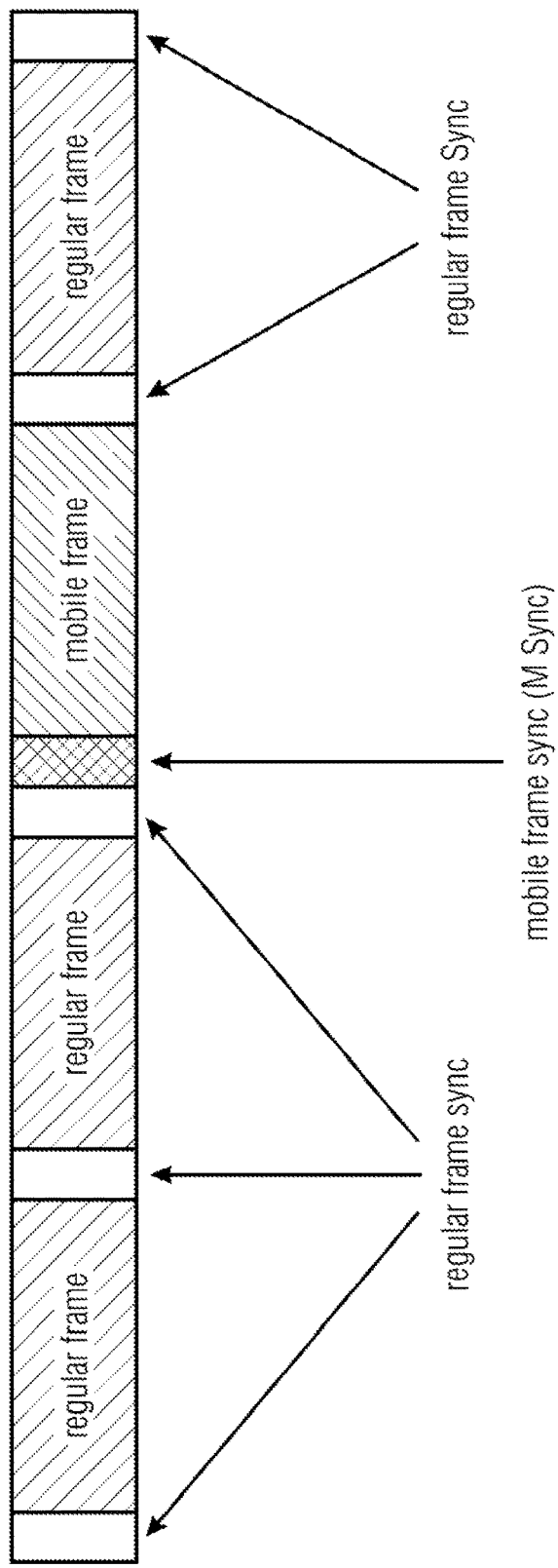
FIG. 5B schematically illustrates an introduction of a so-called mobile frame into the DVB-S2 multiplex according to [9]

FIG. 5B relates to the contribution [9] of another contributor of the call-for-technology. An insertion of special mobile frame and an additional pilot structure only for mobile terminals or terminals in low SNR conditions is proposed to extend the SNR range from −3 dB to −10 dB. This mobile frame represents a new frame type, which shall be multiplexed with the regular DVB-S2 frames as shown in FIG. 5B. Herein, the "Regular Frame Sync" refers to the PLH, which contains a start-of-frame preamble sequence.

The mobile frame is composed of a DVB-S2 compliant PLH, a "Mobile Frame Sync" (a unique word field (UW) of 720 symbols), and the data frame with π/2 BPSK modulation and possible spreading. The PLH definition is updated to contain now two extra MODCODs, which are used to signal the modulation and spreading factor (1 or 2) and therefore the presence of this mobile frame. Different UW sequences are used to distinguish different code rates of the data frame. For this purpose, the Walsh-Hadamard construction of sequences is used.

If pilots are switched ON, also the mobile frame has to feature the DVB-S2-compliant pilot structure. However, an additional pilot pattern of the same length as in DVB-S2 is specified for the mobile frame. It is inserted between the regular DVB-S2 pattern to get twice as many pilots as in the legacy S2 frame.

As stated in the proposal [9], the mobile terminal or terminal in low SNR conditions has to work in the challenging burst mode demodulation due to this mobile frame concept. Thus, the long mobile frame sync sequence is necessitated for every mobile frame. Unfortunately, the additional pilot pattern is not described in detail. This is an issue because a pure doubling of the pilot pattern with the DVB-S2 pilot fields of length 36 would further shift the data slot pattern (90 symbols per slot). To stay compliant with expected pilot grid by the legacy DVB-S2 receivers, whole slots have to be used for the extra pilot fields to keep the slot grid.

Figure 5C:
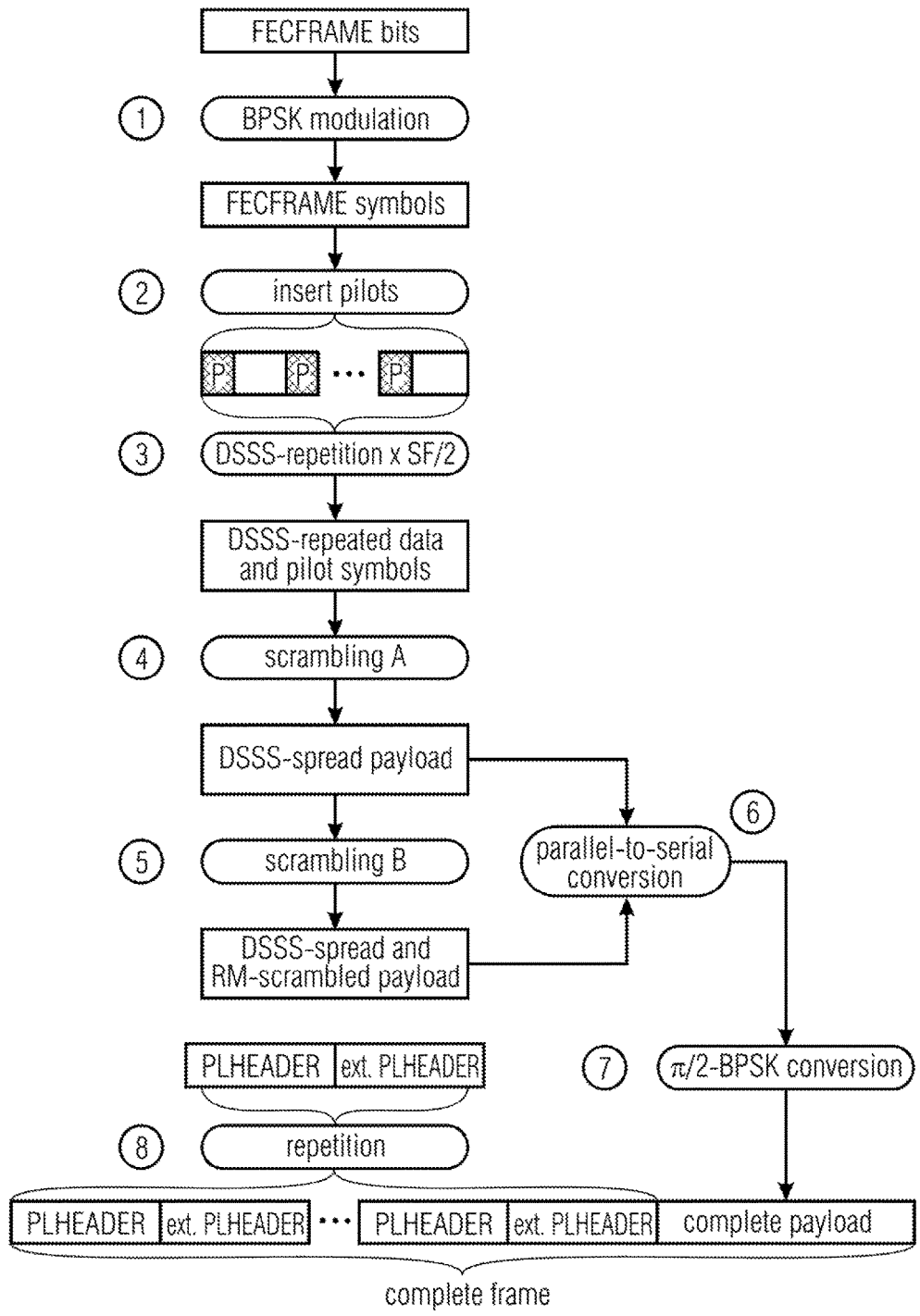
FIG. 5C schematically illustrates a combined spreading and two-stage scrambling approach according to [10]

FIG. 5C relates to a proposal [10] to the Call-for-technology by a further contributor. A special frame-type called "custom frame" is introduced to the ACM/VCM multiplex. It comprises a common PLH+extended PLHeader, which covers signaling of Spreading Factor (SF), robust modulation and code rates, and duration of the custom frame. The extra header shall be scrambled by another sequence than the common PLH.

Concerning the framing, the PLH+ext.PLH are repeated SF-times. For the payload, pilot insertion and Direct Sequence Spectrum Spreading by SF/2 is applied to the XFECFRAME, i.e. symbol-wise repetition. Then, a specific two-stage scrambling and sequence-repetition (assumed repetition by SF/2) is performed and interleaved as shown in FIG. 5C.

Reference [11] relates to a further contribution to the Call-for-technology by another contributor. Concerning the low SNR approach in this proposal, a symbol-wise spreading is proposed like the RCS Forward link "Mobile Opt" [6]. However, the following modifications are proposed: PLH and pilots are spread, but the XFECFRAME only where necessitated, i.e., a carrier is configured again statically by a worst-case spreading factor, which leads to spreading of all PLHs and pilots of the carrier. The scrambling as specified in [6], which is done on the whole frame=PLH+Pilots+XFECFRAME, is not adopted, but the DVB-S2 scheme is kept except of not resetting the scrambler for dummy frames.

In the proposal [11] relative to the Call-for-Technology, a complete revision of the DVB-S2 standard is proposed with main focus on new MODCODs. The low SNR extension corresponds to a rather straight forward way to extend the whole signaling (PLH+Pilots) of the carrier by spreading, i.e. ACM/VCM is possible but with permanent overhead according to the chosen SF.

Figure 5D:
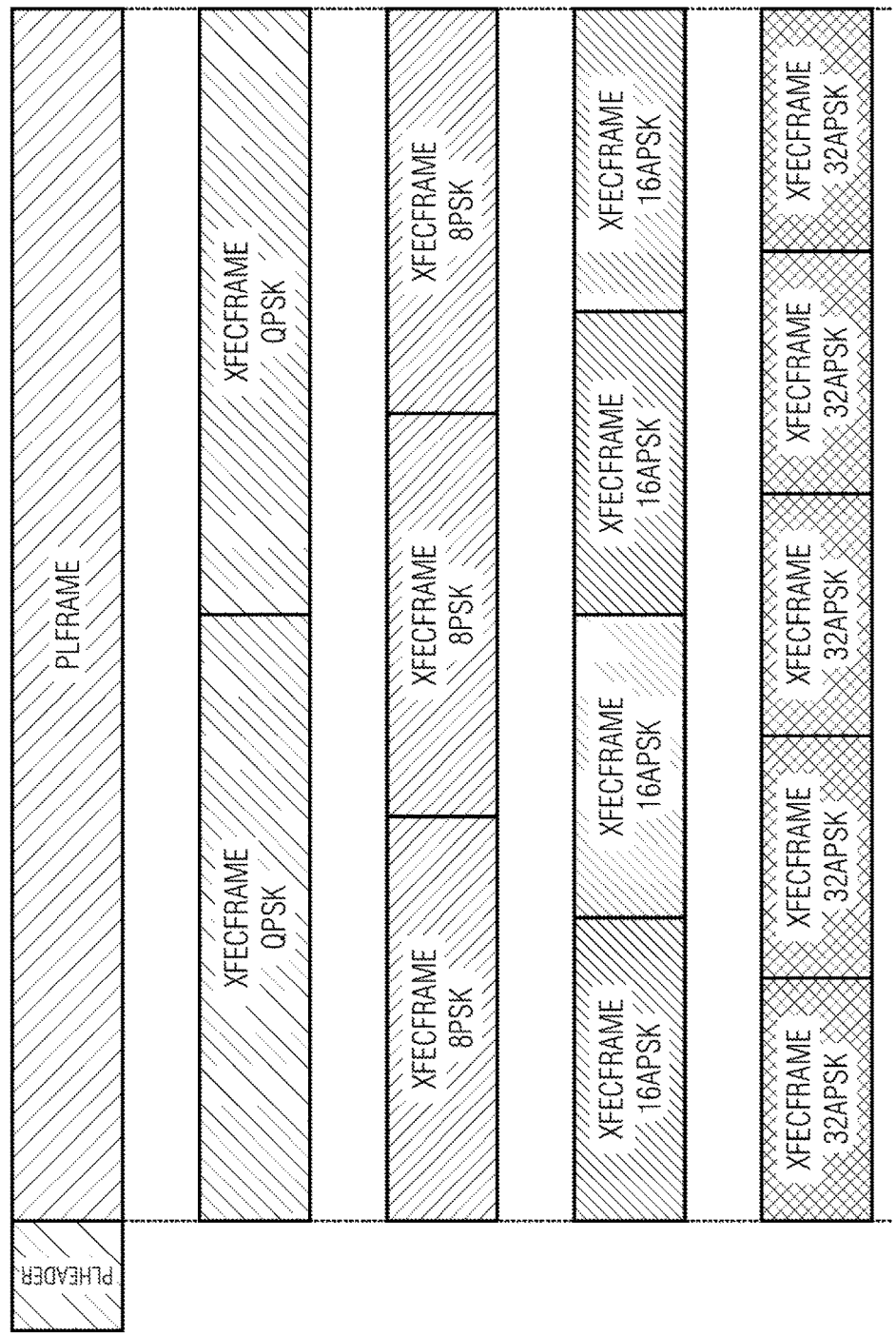
FIG. 5D schematically illustrates a constant framing approach (PLFRAME length of 16686 symbols) according to [12]

FIG. 5D relates to the proposal according to reference [12]. The proposal combines a constant framing approach, which is beneficial for the terminal in case of severe channel conditions, with the possibility of spreading by frame-wise repetition. Constant framing is achieved by collecting 1 XFECFRAME with BPSK, 2 for QPSK, 3 for 8 PSK, 4 for 16APSK, 5 for 32APSK or 6 for 64APSK to get a constant PLFRAME length of 16686 symbols, where pilots are ON. This is depicted in FIG. 5D, where one PL-Header per PL-Frame is used (90 or 180 symbols).

The low-SNR-robustness is achieved by using BPSK and repetition of the XFECFRAMEs by means of coupling SF PL-Frames. Five repetitions of the PL-Header are defined for those frames necessitating the robustness. However, it is proposed that the repetitions can be placed in the padding field of the (previous) BB-Frame, i.e. together with the raw data before channel coding. In addition, reconfigurable framing is proposed to switch between (the original) variable-length and constant-length frame-type. This shall be allowed with some kind of pre-signaling of switching.

Unfortunately, the constant framing will increase buffer-sizes at TX and RX and may lead to higher throughput requirements for the terminal decoder solutions. The direct PL-Header repetition only for the PL-Frames with robustness requirements leads again to the more challenging burst mode kind of terminal. The alternative idea of putting the PL-Header repetitions into the BB-Frame is even more challenging, because it leads to a "chicken-and-egg problem" when trying to decode. Reconfiguration of the framing-structure contradicts their arguments for constant framing and will in the end be an additional burden for the terminals in low SNR conditions.

Figure 5E:
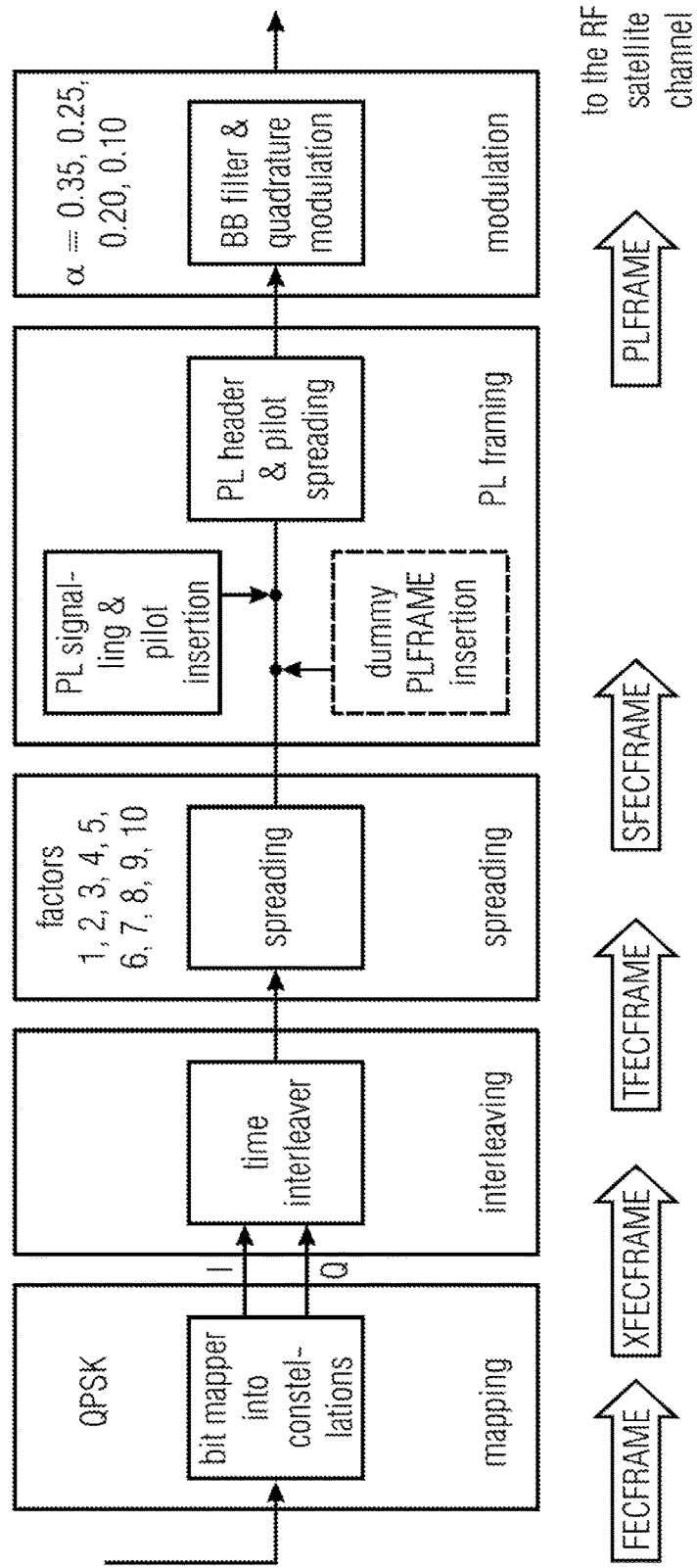
FIG. 5E schematically illustrates a part of the transmitter structure implementing the low SNR approach according to [13]

FIG. 5E is related to a further proposal by another contributor to the above-mentioned Call-for-technology [13]. A complete low SNR protection level table specifying combinations of modulation, code rates and spreading is proposed. Also a time interleaving is introduced. Interleaved XFECFRAMEs are then called TFECFRAMEs. The TFEC-FRAME (incl. possible pilots) is spread by DSSS, as shown in FIG. 5E, to get an SFECFRAME. The introduced spreading appears to be a mixture of symbol-wise repetition plus scrambling by multiplying with an m-sequence. The start-of-frame preamble is statically spread by 16 and the PLS code of the PLH by 10.

Unfortunately, there is no signaling proposed whether the legacy or the new low SNR protection level table should be expected at the receiver. Thus, it seems that it is envisaged that either the conventional DVB-S2 OR the proposed low SNR approach is valid for a carrier. This means that no ACM/VCM adaption over the whole SNR-range can be done. Thus, a two-profile approach is proposed here.

Reference [14] relates to a further proposal by a further contributor to the Call-for-technology. In this contribution, rather high-level considerations are provided concerning the mobility, low SNR, and according signaling issue. The need for longer SOF and pilot sequences is considered and the pros and cons of a global or per profile optimization are given. For signaling, a general time slicing approach with PLS chaining is proposed, where in the low SNR case extra signaling will be added to the PLH in additional slots. This is similar to the approach of [10], where this addition by chaining is called extended PLH.

With the provided discussion of the various approaches proposed by the contributors to the CfT [7] it turned out that none of these approaches provides the valuable combination of flexible framing, (smooth) extension of the SNR operation range, and overhead-efficient introduction of spreading (in combination with modulation order and/or code rate) to enable PLH tracking also to terminals under severe channel conditions. Either approaches with static spreading of the PLH or approaches, which define a separate low SNR profile, do not feature the aimed combination of embodiments of the present invention. Also the approaches with dynamic PLH spreading suffer from high overhead and the need for burst mode capable receiver architecture, because PLH tracking is not intended and therefore not possible.

The responses to the recent DVB-S2 CfT [7] are considered to be the work of researchers with enhanced skills. They also refer to former approaches, which have been discussed above and where researchers have already been confronted with the same problem as at hand now. Nevertheless, as far as the inventors know, no comparable solution has been proposed so far.

With respect to the protection level, note that not all three parameters of the protection level have to be used for the two-stage signaling. Also subsets are possible like e.g. signaling of PLH modulation and spreading, but keeping a fixed PLH code rate.

The preamble sequence "start-of-super-frame (SOSF)" signals the start of a new super-frame. Next, the super-frame header (SFH) is transmitted, which signals at least the PLH protection level of this super-frame. Secondly, if there is no PL-frame alignment into the super-frame, means may be provided to point to the first PLH of the super-frame, e.g. the number of CUs to the first PLH may be signaled by the SFH. However, if one necessitates omitting the pointer, still the default semi-blind PLH search/acquisition from DVB-S2 can be applied or the PL-frames are aligned to the super frame start, which may necessitate padding.

Furthermore, the SFH can be used to signal whether pilot fields should be inserted into the super-frame or not. If pilot fields are aligned to the super-frame structure, the length of the pilot fields is chosen such that again an integer number of CUs as well as the same super-frame length in symbols results (to keep the constant framing feature). However, as an alternative, the pilot fields can also be kept aligned to the individual PL-frame as in DVB-S2 but are then not aligned to the super-frame structure.

A similar selection can be made with respect to the scrambling. One can keep the original PL-Frame-wise scrambling scheme from DVB-S2 or do scrambling over the whole super-frame. In the second case the scrambling sequence generator reset would be aligned to the SOSF irrespective of the PL-frame distribution within the super-frame.

Figure 6:
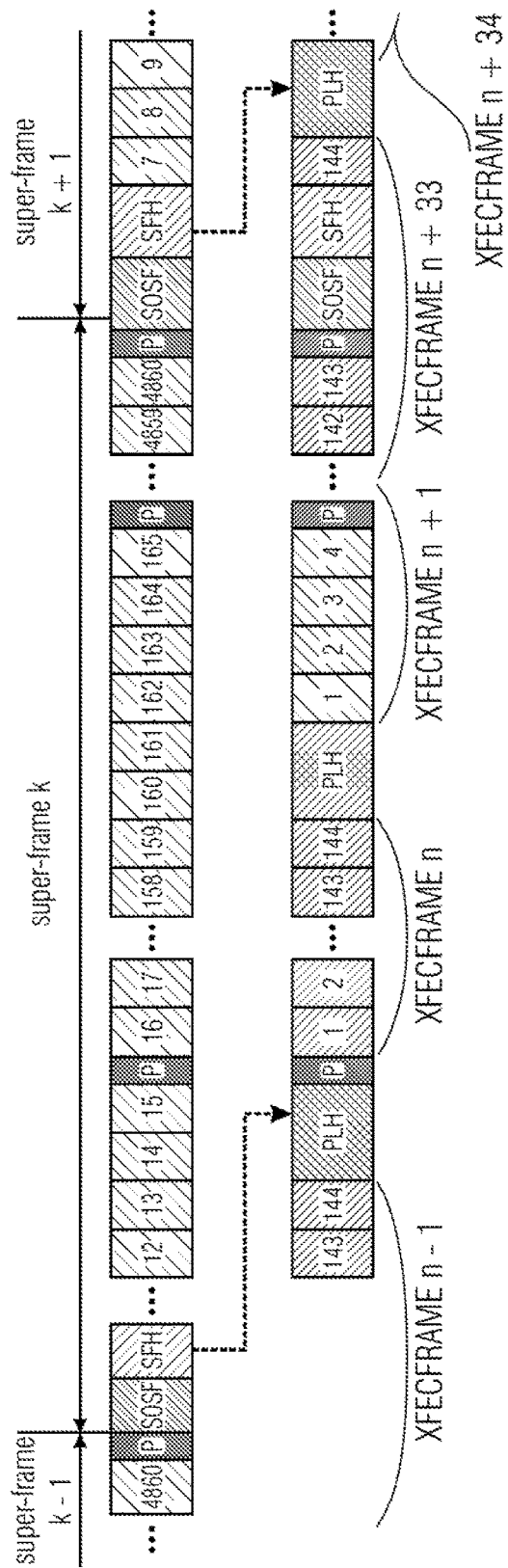
FIG. 6 schematically illustrates a super-frame structure according to at least one embodiment of the present invention.

An example of this super-frame structure is shown in FIG. 6 without spreading. In the first row, the frame structure is shown with the available CUs, in total 4860 here. In the second line, parts of the super-frame with filled CUs are shown, where each PLH is assumed to need 2 CUs and each XFECFRAME 144 CUs. In FIG. 6, the most robust case is shown, where the pilots are switched ON and aligned in a regular manner to the super-frame and where the SFH contains a pointer to the first PLH of the super-frame.

The two-stage signaling can be motivated as follows. Instead of forcing all PLHs of the carrier to the most robust protection level with the corresponding overhead, it is proposed to specify only the introduced first stage, the SFH signaling, according to the most robust protection level. The SFH provides the signaling information about the applied protection level of the PLHs of the current super-frame. On the next lower hierarchy level each PLH contains the individual configuration information of the consecutive XFECFRAME like modulation, code-rate, spreading, normal or short code word size, and input stream identifier (ISI).

To enable PLH tracking also for terminals in low SNR conditions, only the PLHs of the current super-frame have to feature the same robust protection level, which contains data for the terminals in low SNR conditions. Thanks to the constant-framing feature, this terminal can stay synchronized and does not necessitate the more challenging burst mode demodulation.

It is worthy to note that the concept of a flexible protection level of the PLH signaling (possibly shifting to higher-order modulation orders and thus saving symbol rate) is very efficiently combined with the super-frame concept. This is because the terminal synchronization is kept through the super-frames, while entire super-frames can be dropped in case the terminal is in such severe conditions that those (flexible) PLHs cannot be decoded which were transmitted at a lower protection level than compatible with said severe conditions. The super-frame synchronization remains locked, while the PLH synchronization can be established via the pointer to the first PLH of the current super-frame.

The low SNR conditions put also additional burdens to the synchronization algorithms. If pilot fields are switched ON, the signaling of the spreading factor can also be used to accomplish a pilot field extension, i.e. to enlarge the pilot fields to provide more reference data for the synchronization task. Extending the pilot field by exactly the spreading factor is only a special case. As discussed above, pilots may be aligned to the super-frame structure or to the PL-frame structure. In both cases, the spreading factor signaled via SFH can be used for a super-frame-wise pilot spreading rule. On the other hand, the spreading factor signaled via PLH can be used for a per-PL-frame pilot spreading rule as an alternative solution. It is recommended to use the PL-frame-wise pilot spreading with pilots aligned to the super-frame structure and the pilot ON/OFF switch signaled by the SFH. This represents a trade-off between the robust configuration for reception under low SNR conditions and only as much overhead as necessitated.

The concept of the super-frame header specifying the transmission parameters for the subsequent frame headers within the current super-frame is the basis for a possible intelligent throughput scheduling on top. The multiplexing scheduler has the target to maximize the throughput by exploiting the flexible features of the invention. The invention enables a scheduler to group PL-frames with similar target protection level/level-range within a suitable super-frame to be transmitted soon. Therefore, the same necessitated overhead due to PLH spreading, but appropriate protection level can be spent for signaling in each super-frame. Thus, this multiplexing scheme will minimize the total overhead.

As a first exemplary approach, one can define a table of super-frame minimum protection levels, which is then used for sorting XFECFRAMEs to "generic containers":

If any XFECFRAME necessitates robustness<xxx dB of SNR, the super-frame builder applies spreading/modulation/code rate selection #1.

If any XFECFRAME necessitates xxx<robustness<yyy dB of SNR, the super-frame builder applies spreading/modulation/code rate selection #2.

And so on.

Buffers may be provided to delay XFECFRAMEs, which necessitate stronger robustness than configured for the currently filled super-frame. Thus, the next super-frame will feature the strongest protection/robustness level, which is necessitated by the XFECFRAMEs in the buffer.

The proposed concept can be characterized by the following aspects, some of which may be optional:

Super-frame structure, which allows robust acquisition and synchronization due to its constant length Two-stage signaling by means of a SFH and several PLHs per super-frame PLH-tracking is assured by pointer to the first PLH within the SFH Robustness is assured by spreading of the PLHs according to the SFH signaling and by spreading of the XFEC-FRAME by frame-individual PLH signaling Extension by an overhead-minimizing multiplex scheduling With a combination of at least some of the above aspects, the aimed efficient way of introducing spreading and enhancing the receiver acquisition and synchronization is achieved. Furthermore, no restrictions are introduced on the way, one may want to specify the appearance of pilot fields or the way of scrambling.

An exemplary embodiment is described now which represents an enhancement approach to introduce spreading to DVB-S2 in an efficient way. Although the shown examples are given for a TDM transmission system, the novel signaling concept is not limited to it. For instance, the concept can also be applied to code-division-multiplexing (CDM) or frequency-division-multiplexing (FDM).

Figure 7:
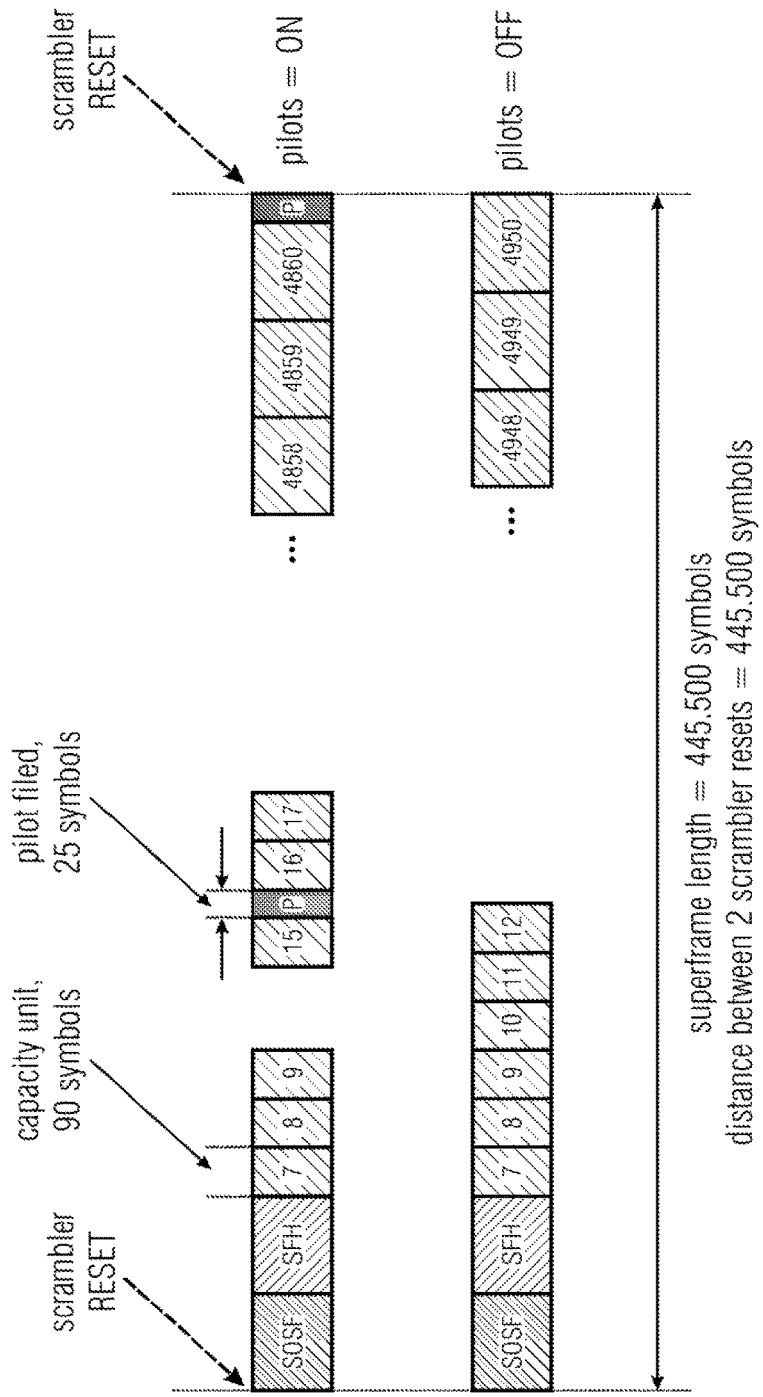
FIG. 7 schematically illustrates super-frames of constant length with pilots being present in one of the super-frames and no pilots in the other super-frame.

First, the concept of "constant frames" and "capacity units" is described. Super-frames are defined comprising 445 500 symbols, for example. The complete L1 signaling (SFH/PLH) transports the information on input stream identifier (ISI) of each individual XFECFRAME and thus allows a completely flexible, packet-switched injection and demodulation of XFECFRAMEs. This concept makes the waveform completely wideband-capable by using "time-slicing". FIG. 7 shows the chosen super-frame concept.

The parameters are, for example:

The super-frame length is fixed to a unique number of symbols (445,500 symbols)

The super-frame length in symbols is independent of setting pilots ON/OFF.

The full super-frame is scrambled, including all SOSF/SFH elements and pilots

The scrambler is reset with the first symbol of the SOSF sequence

The super-frame is split into "capacity units" (CUs) of length 90 symbols and, if applicable, pilot blocks After 15 capacity units, a pilot sequence of length 25 symbols CAN be injected, defined as mode with pilots==ON With pilots==ON, the super-frame consists of 4860 CUs With pilots==OFF, the super-frame consists of 4950 CUs The first 6 CUs per each super-frame are fixed with the SOSF and the SFH The numbers above have been chosen according to different trade-off analyses. Other parameterization is in principle possible. Examples are:

Length and occurrence of pilot field (relatively free to be optimized)

Number of CUs between two pilot fields (relatively free to be optimized)

Super-frame length (in symbols) according to specific formulas with limited choices Content of the Core Signaling Elements:

The field(s) SOSF (Start-Of-Super-Frame) has the following properties or comprises, for example:

a sequence with good cross-correlation or auto-correlation properties length of 190 symbols The SFH (Super-Frame Header) may comprises, for example:

11 bit: pointer to the first PLH (counting in CUs, since start of super-frame)

1 bit: pilots==ON/OFF in the corresponding super-frame 2 bit: maximum spreading within this super-frame encoded length: 350 symbols (with BPSK (Binary Phase Shift Keying) and code rate R=1/25)

The frame header PLH (Physical Layer Header) with a total length of 180 symbols may comprise, for example:

a pre-defined "SOF" (Start-Of-Frame) sequence of 20 symbols a PLSCODE containing:
  3 bit: MOD/SPREAD (indicator for modulation and spreading), see table 1 below
  4 bit: COD (indicator for code rate), see table 2 below
  8 bit: SID (stream ID)
  1 bit: short/long code words
  encoded length: 160 symbols (with BPSK, code rate R=1/10)

The SOSF and the SFH are fixed elements which mark the start of a super-frame. The SFH contains parameters relevant for the entire super-frame like pilots on/off, spreading activated, and a pointer to the FIRST PLH. The maximum pointer value depends on the size of the CU and the maximum codeword length (in CUs). The spreading factor, if applicable, has to be taken into account. For example, for a size of CU=90 symbols as a factor of the XFECFRAME length, the pointer has to cover 11 bit. These 11 bit cover the worst-case distance (=amount of CUs) between the SOSF and the first PLH of the super-frame. The pointer value 0 points to the first CU in the super-frame, thus the start of the SOSF.

A PLH occurs in front of every XFECFRAME, independent on the length of the XFECFRAME or the actual start of a XFECFRAME within the super-frame. The PLH corresponds in length to two CUs or 180 symbols. As mentioned above, the PLH contains a SOF and the PLS-codeword.

In the present embodiment, the FIRST occurrence of a PLH is indicated in the SFH, while the positions of further PLHs can be calculated from the previous PLH signaling information.

Regarding design target for decoding thresholds, desirable decoding and detection thresholds may be defined as follows:

SOSF: Should be detectable at approx. −9.0 dB as it can be used for interference detection and mitigation. Additionally, the detection threshold has to be lower than the decoding threshold for the SFH.

SFH: Should be decodeable at approx. −8.5 dB as the lowest $E_s/N_0$ (Ratio between the energy per transmitted symbol and single sided noise power) which is supported by the waveform in the order of −8.3 dB and as it carries information on potential spreading and dynamic pilot switching inside the super-frame. With the low $E_s/N_0$ operation range mainly applicable to interactive services, two different targets have been defined:

WER=$10^{-5}$ for interactive applications at the lowest $E_s/N_0$ threshold of −8.5 dB WER=$10^{-7}$ for broadcast applications at the lowest $E_s/N_0$ threshold of −7.0 dB PLH: Should be decodeable at approx. −3.0 dB as it does only need to be as strong as the most protected, unspread XFECFRAME. The effective $E_s/N_0$ seen by the PLH decoder in case of spreading is also not lower than this target. The WER target for the PLH is $10^{-7}$.

Although, the PLH specification above is related to PLH spreading only as a low SNR extension, it is in general possible to be combined with different modulation orders or code rates. Then, the transmission parameters of the PLHs are varying from one super-frame to another according to the desired payload decoding threshold. Thus, specific combinations of modulation, code rate and spreading define different decoding thresholds and are selected according to the lowest decoding threshold of the payload data in the current super-frame plus some margin.

The L1 signaling elements are now defined for the illustrative example:

SOSF Sequence

The SOSF sequence comprises 190 symbols. Before the entire super-frame is subject to scrambling, an all-zero bit sequence shall be QPSK-mapped. This is equivalent to injecting a constellation point (1+1i)/sqrt(2) if the actual mapping process shall be avoided. The transmitted SOSF sequence is identical to the first 190 symbols generated by the scrambling sequence.

SFH Code

The SFH code is constructed from a tail-bited convolutional code of rate 1/5. The definition is as follows:

Number of information bits: 14
  11 bit pointer to first PLH (in number of CUs)
  1 bit pilots on/off, 0=pilots off, 1=pilots on
  2 bits maximum spreading within current frame
    '00': highest spreading factor within this frame=1
    '01': highest spreading factor within this frame=2
    '10': highest spreading factor within this frame=4
    '11': RFU Block repetition with a repetition factor of 5

Overall "code rate" is 1/25

The decoding threshold for the SFH code is approx. −7.5 dB SNR at a target WER of $10^{-7}$. The SFH code is scrambled with the super-frame scrambling.

SOF Sequence

The SOF sequence is part of the PLH and consists of 20 known symbols. Before the entire super-frame is subject to scrambling, an all-zero bit sequence shall be QPSK-mapped. This is equivalent to inject a constellation point $(1+1i)/\sqrt{2}$ if the actual mapping process shall be avoided. The SOF sequence is scrambled with the super-frame scrambling.

PLH Code

The PLH code is constructed from a tail-bited convolutional code of rate 1/5. The definition is as follows:

Number of information bits: 16

3 bit MOD/SPREAD, see table 1

4 bit COD, see table 2

8 bit SID (ISI)

1 bit short/long: 0=long, 1=short

Block repetition with a repetition factor of 2

Overall "code rate" is 1/10

The decoding threshold for the PLH code is approximately −3.5 dB SNR at the target WER of $10^{-7}$. The PLH code is scrambled with the super-frame scrambling.

The definition of the MOD/SPREAD field is as follows, where the modulation number refers to the modulation order, e.g. 3=8PSK:

TABLE 1

Joint representation of modulation and spreading within a single bit-field

| | bit value | | | | | | | |
|---|---|---|---|---|---|---|---|---|
| | '000' | '001' | '010' | '011' | '100' | '101' | '110' | '111' |
| modulation | 1 | 1 | 2 | 2 | 2 | 3 | 4 | 5 |
| spreading | 2 | 1 | 4 | 2 | 1 | 1 | 1 | 1 |

TABLE 2

Representation of FEC code rate

| | Bit value | | | | | | | |
|---|---|---|---|---|---|---|---|---|
| | '0000' | '0001' | '0010' | '0011' | '0100' | '0101' | '0110' | '0111' |
| Code rate | RFU | 1/4 | 1/3 | 2/5 | 1/2 | 3/5 | 2/3 | 3/4 |
| | Bit value | | | | | | | |
| | '1000' | '1001' | '1010' | '1011' | '1100' | '1101' | '1110' | '1111' |
| Code rate | 4/5 | 5/6 | 8/9 | 9/10 | RFU | RFU | RFU | RFU |

The abbreviation RFU stands for reserved for future use.

The following table 3 defines the resulting codeword lengths (in CUs) per combination of MOD/SPREAD and SHORT/LONG:

TABLE 3

XFECFRAME lengths in CU according to MOD/SPREAD and LONG/SHORT

| | Bit value | | | | | | | |
|---|---|---|---|---|---|---|---|---|
| MOD/SPREAD | '000' | '001' | '010' | '011' | '100' | 101' | '110' | '111' |
| Modulation | 1 | 1 | 2 | 2 | 2 | 3 | 4 | 5 |
| spreading | 2 | 1 | 4 | 2 | 1 | 1 | 1 | 1 |
| CUs, Long XFECFRAME | 1536 (*) | 720 | 1536 (*) | 768 (*) | 360 | 240 | 180 | 144 |
| CUs, Short XFECFRAME | 384 (*) | 180 | 384 (*) | 192 (*) | 90 | 60 | 45 | 36 |

The asterisks (*) in Table 3 indicates XFEFRAMES with SPREAD >1 which contain additional pilot CUs to enhance the cycle slip performance.

Pilot Fields

In case the super-frame shall consist of regular pilots (within the SFH code, "pilots on/off" is set to "on"), pilot fields of length 25 symbols are regularly inserted after each 15 CUs, counting from the start of super-frame including the CUs for SOSF/SFH (six CUs).

Before the entire super-frame is subject to scrambling, an all-zero bit sequence shall be QPSK-mapped. This is equivalent to injecting a constellation point (1+i)/sqrt(2) if the actual mapping process shall be avoided. The pilot fields (if present) are scrambled with the super-frame scrambling.

In case the SFH signals spreading>1 within the current super-frame, and the current PLH indicates a spreading factor>1 for the actual XFECFRAME, an additional CU is dedicated as pilot sequences. Each pilot field which is preceded by a CU from a spread XFECFRAME or by the whole PLH (including the spreading repetitions) is then extended with an additional pilot CU, consisting of constant I/Q symbols with constellation point (1+i)/sqrt(2). The extension is shown in FIG. 8B and denoted as P2 field. These pilot fields are then also scrambled with the super-frame scrambling.

Referring now to FIGS. 8 and 9, the mapping of XFEC-FRAMEs into super-frames is described.

Figure 8A:
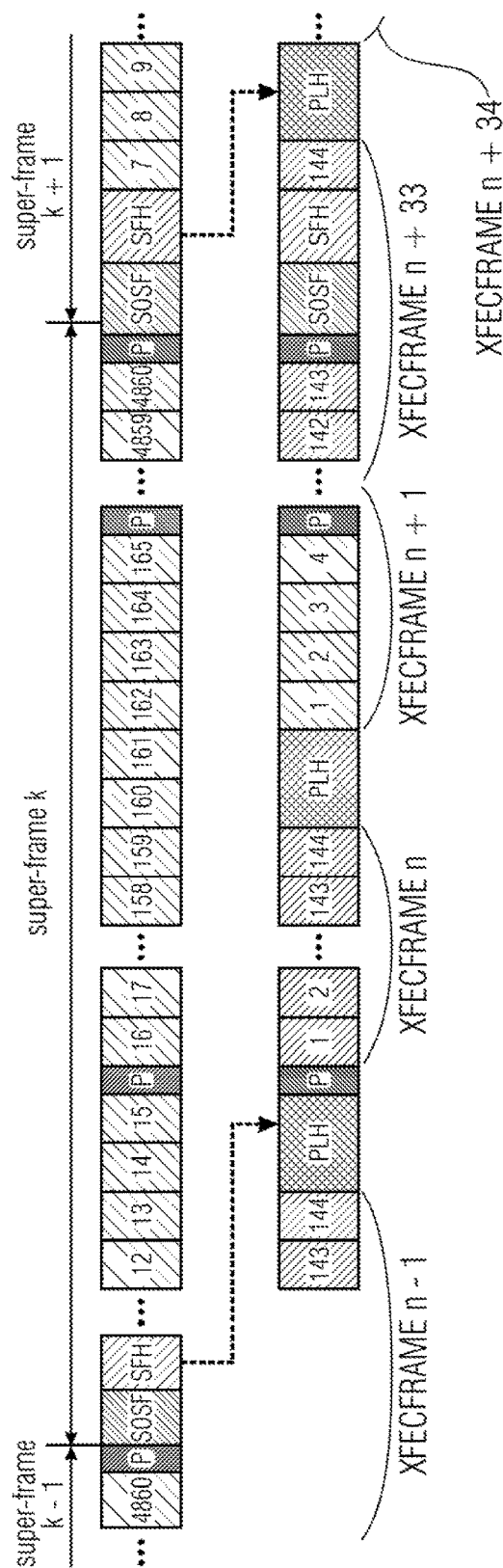
FIG. 8A schematically illustrates a mapping of XFEC-FRAMEs into super-frames.
Figure 8B:
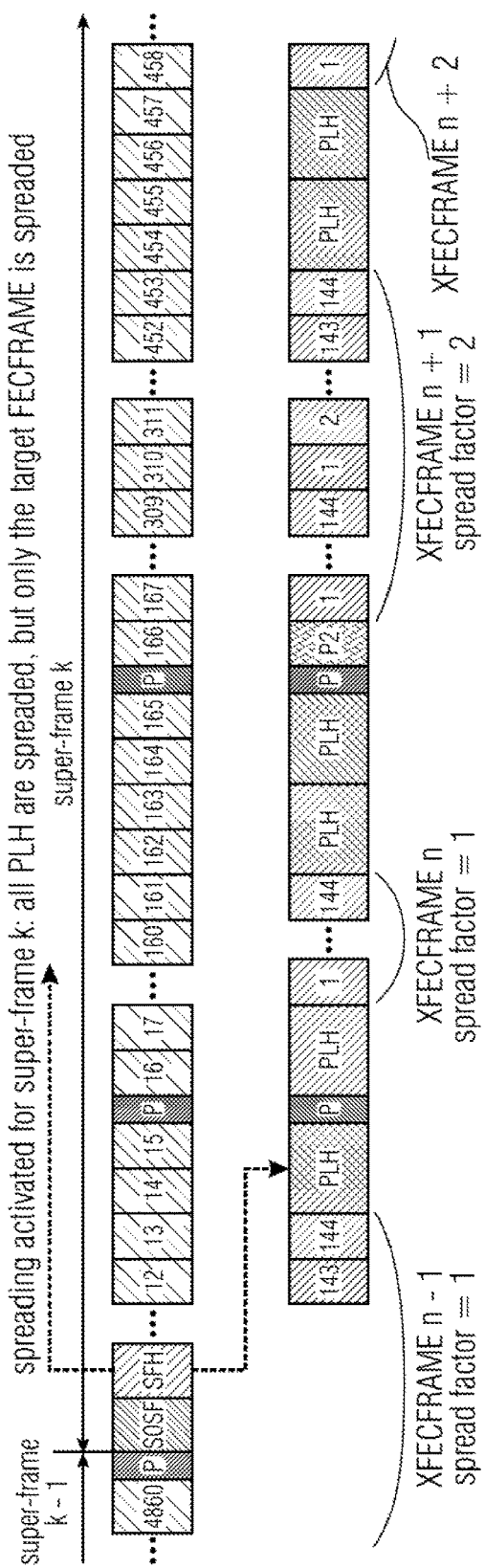
FIG. 8B schematically illustrates an application of spreading to a single XFECFRAME within one super-frame.

FIG. 8A schematically illustrates the mapping of XFEC-FRAMEs into super-frames without spreading. The main characteristics of the mapping of XFECFRAMEs into super-frames are:

XFECFRAMEs have no alignment with super-frames
Each XFECFRAME is preceded by a PLH (PLHEADER) of length 2 CU=180 symbols
Individual XFECFRAMEs can span over more than one super-frame
The SFH contains a pointer to the FIRST PLH occurring in the current super-frame (dotted arrow from SOSF to PLH)

For FIG. 8A, a fixed XFECFRAME length of 144 CUs has been used, while for the generalized case, any XFEC-FRAME length can be accommodated per XFECFRAME.

Concerning the total length of the super-frame, there is no difference between the mode with pilots==ON and pilots==OFF, except that the number of CUs which can be assigned per super-frame are different:

4854 CUs/super-frame with pilots==ON
4944 CUs/super-frame with pilots==OFF

FIG. 8B schematically illustrates the mapping of XFEC-FRAMEs into super-frames with spreading, more particularly the application of spreading to a single XFECFRAME within one super-frame. The key idea for the efficient support of spreading within one super-frame is:

The SFH contains the information on whether spreading is applied to this particular super-frame
If spreading is signalled, ALL PLHs of the entire super-frame have to be repeated by the spread-factor as signalled in the SFH, independent on whether an individual XFECFRAME is spread or not
In this manner, a receiver operating in low SNR regions can continue to track the PLHs until it finds the XFECFRAME which belongs to him.
Each XFECFRAME which is necessitated to be spread has to repeat each CU by the spread-factor as indicated in the SFH
Note: Mixing the actual spread-factor is possible as long as it is less or equal the SFH spreading indicator. More specifically, if e.g. a (maximum) spreading-factor 4 is signalled by the SFH, the XFECFRAMEs can be spread by 1, 2 or 4 according to the signaling in each PLH.

A spread XFECFRAME is also allowed to be split over two super-frames, where spreading is signalled by the first SFH but not by the consecutive SFH. The receiver has to be aware that also the sequence of PLH repetitions can be interrupted by SOSF+SFH, whose occurrence cycle is known and has to be tracked also by the receiver under low SNR conditions. This concept is in line with the aim of avoiding padding for multiplex efficiency, but may add the requirement of further receiver logic compared to padding.

Spreading itself is implemented as repetition of entire XFECFRAMEs, i.e. for spreading with a factor of 2, the XFECFRAME is transmitted twice consecutively. The order of CUs is as follows (for a spreading factor of 2 and a XFECFRAME length of 144 CUs:

1, 2, 3, 4, . . . 143, 144, 1, 2, 3, 4, . . . 143, 144

This allocation ensures that burst-like impairments such as impulse noise or short-term degradation of the phase estimation, e.g. due to an outlier, does not affect the same CUs of the spread sequence of CUs.

The frame header spreading (PLH spreading) may be justified as follows. The key issue for this justification is that all terminals (each at individual SNR condition) have to be able to decode the PLH to find the target XFECFRAME and to determine the actual spreading factor of their XFEC-FRAME. Especially a terminal, which is in low SNR condition, has to be able to track all PLHs of a super-frame.

Three different cases may occur for a specific terminal:
Terminal SNR>threshold of PLH and SOSF/SFH→All headers can correctly be received and tracked.
Terminal SNR<threshold of PLH, but terminal SNR>threshold of SOSF/SFH→
  If spreading is active in this super-frame, all PLHs can correctly be received and tracked.
  If spreading is inactive in this super-frame, all PLHs cannot be tracked and therefore the target XFEC-FRAME cannot be found. However, the terminal is still able to track SOSF/SFH. It has to wait for better SNR conditions OR super-frames with activated spreading.
Terminal SNR<threshold of PLH and SOSF/SFH→Terminal is completely out-of-sync and has to do re-acquisition.

These considerations base on the fact that the PLH protection level in terms of supported SNR corresponds to the lowest MODCOD without spreading. Thus, the terminal under low SNR condition would not be able to track unspread PLHs. If solely the PLH of the target XFEC-FRAME would be spread, the terminal will not or only with low probability find the spread PLH as the terminal may already have lost the PLH tracking. Without this tracking, the terminal cannot calculate the CU position of the next PLH. Therefore, PLH tracking is possible only if ALL PLHs of a super-frame are spread.

Figure 9A:
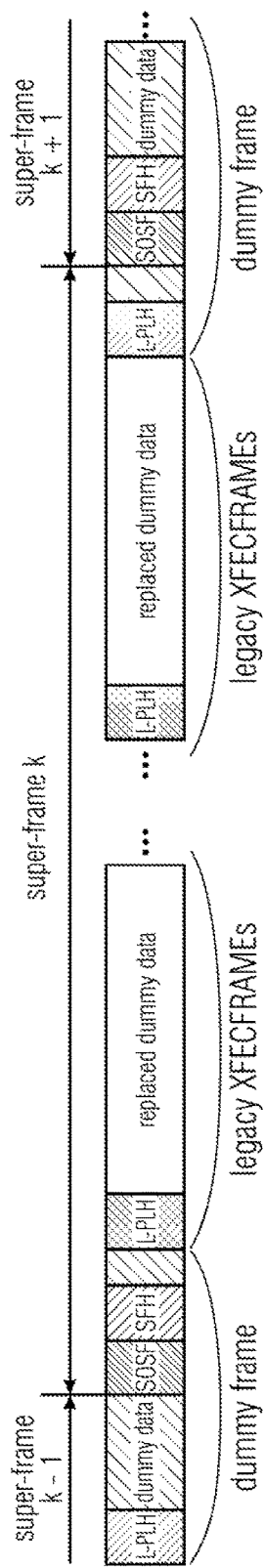
FIG. 9A schematically illustrates an exemplary embedding of SOSF/SFH into legacy dummy frames if no payload with low SNR requirements is to be transmitted.
Figure 9B:
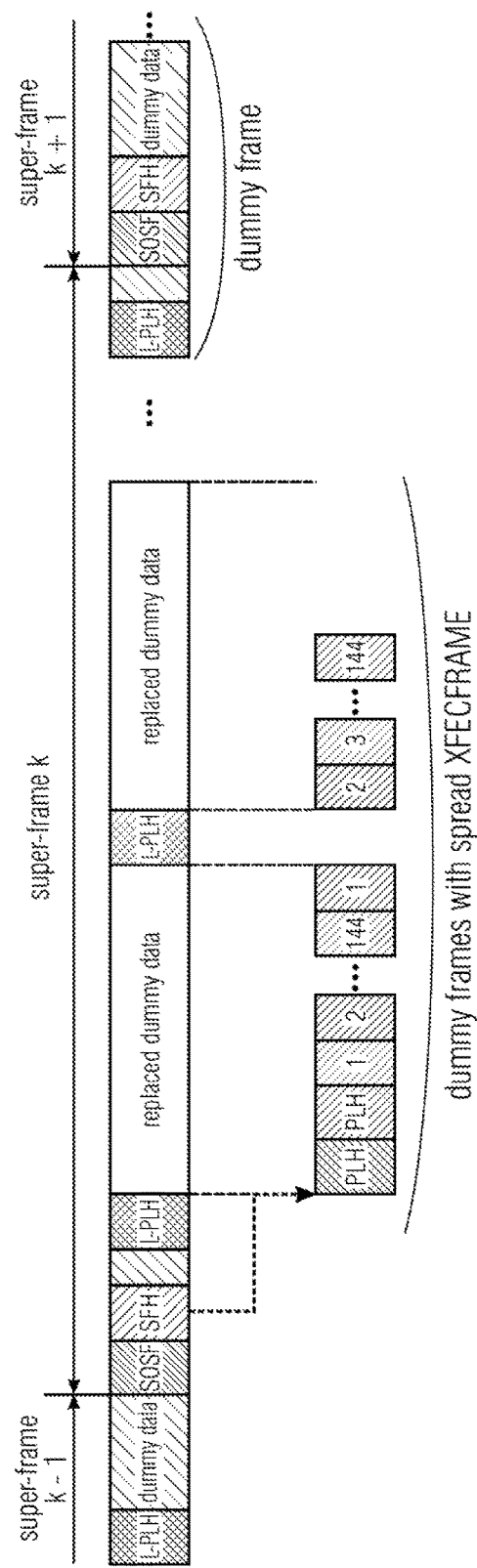
FIG. 9B schematically illustrates an exemplary embedding of SOSF/SFH and spread XFECFRAME into legacy dummy frames.

Reference is now made to FIGS. 9A and 9B. For the sake of partly backward-compatibility, two possible ways of modifying the exemplary embodiment are shown in the following and are based on re-using dummy frames. Dummy frames may be used in transmission standards to fill gaps in the payload data stream. As a legacy receiver will disregard these frames, the dummy data payload can be re-used for the embodiment. In this case, super-frame-wise scrambling and pilot alignment is not possible as it would disturb the legacy receiver.

It is beneficial that the SOSF and SFH appear in a regular manner. Hence, SOSF and SFH can be placed in a dummy frame to not disturb the legacy receiver with its PLH tracking, as the dummy frame also comprises a PLH. The position of SOSF and SFH within a dummy frame can vary because different frame sizes are allowed according to code size and modulation, but this positioning is done with the aim to achieve the constant super-frame length (=constant amount of symbols between two SOSF/SFH). This is shown in FIG. 9A. A dummy frame is typically inserted into the datastream so that its dummy data section spans a transition from one super-frame to the subsequent super-frame. In this manner, the SOSF and the SFH which indicate the beginning of the next super-frame can be inserted at the appropriate position within the payload data section of the dummy frame and thus ensure the constant length property of the super-frames. The rest of the payload data section of the dummy frame is filled with actual dummy data. It can be seen in FIG. 9A that the SOSF and SFH in the left dummy frame spanning the transition from super-frame k−1 to super-frame k are preceded and succeeded by actual dummy data within the payload data section of the dummy frame. Possible conflicts between the SOSF/SFH sequence and a legacy frame header L-PLH regarding one or more particular capacity unit(s) CU can be avoided by appropriately choosing the lengths of the super-frames and/or of the frames. Between the bounding dummy frames, the super-frame k may comprises a plurality of legacy XFECFRAMEs which may be decoded by legacy receivers as well as receivers working under the proposed two-stage signaling concept, provided they experience sufficiently good receiving conditions.

The payload with common SNR requirements are transmitted in the legacy framing format=legacy PLH (L-PLH)+payload part, as schematically illustrated in FIG. 9A. It is typically not necessitated that the SFH comprises a pointer to the next legacy frame header L-PLH, since a receiver (legacy or according to embodiments described herein) that is not able to detect and decode the legacy frame headers L-PLH typically has no chance of decoding the payload data, anyway, which has a lower or the same protection level as the legacy frame header L-PLH.

The concept proposed herein makes it possible to extend the SNR range towards lower SNR values, at the cost of reduced transmission efficiency. If one or more frames with low SNR requirements have to be transmitted, they may be embedded in dummy frames directly after the dummy frame with the SOSF/SFH. This is shown in FIG. 9B. In this case the SFH has again to signal the start of the spread XFECFRAME by a pointer as SOSF/SFH are not aligned to the CU pattern and the receiver in low SNR conditions cannot track the L-PLHs. However, the spread XFECFRAMEs are aligned to the CU pattern of the dummy frames. FIG. 9B shows that the section of the replaced dummy data in the dummy frames is first filled with the two spread frame headers PLH (spreading factor 2), followed by the capacity units 1-144 of the first version of the spread XFECFRAME. The first capacity unit of the second version of the spreaded XFECFRAME still fits into the section of replaced dummy data of the dummy frame. At this point, the legacy dummy frame ends so that a legacy frame header L-PLH has to be inserted that indicates to legacy receivers that a further dummy frame follows. As the length and structure of the dummy frame is also known to the robust receiver exploiting the proposed method, the position of continuation of the CUs of the spread XFECFRAME is known. The further dummy frame comprises the capacity units 2 to 144 of the second version of the spread XFECFRAME. The remainder of the dummy data section of this dummy frame can be filled with actual dummy data. However, if further spread XFEC-FRAMEs are due for transmission, the remainder of the dummy data is filled with the next spread XFECFRAME.

The legacy headers L-PLH may not be detectable or even decodable by a receiver in which the proposed two-stage signaling concept is implemented, if said receiver is in poor reception conditions. Nevertheless, the spread frame headers PLH and the spread capacity units within the dummy data section of the dummy frame may be decodable by said receiver as these currently (at least within the current super-frame k) have a higher protection level than the legacy frame headers L-PLH. Thus, all the newly introduced means of the invention to keep a receiver in low SNR conditions in tracking (on super-frame basis) can be accomplished by embedding into the legacy dummy frames.

Figure 10:
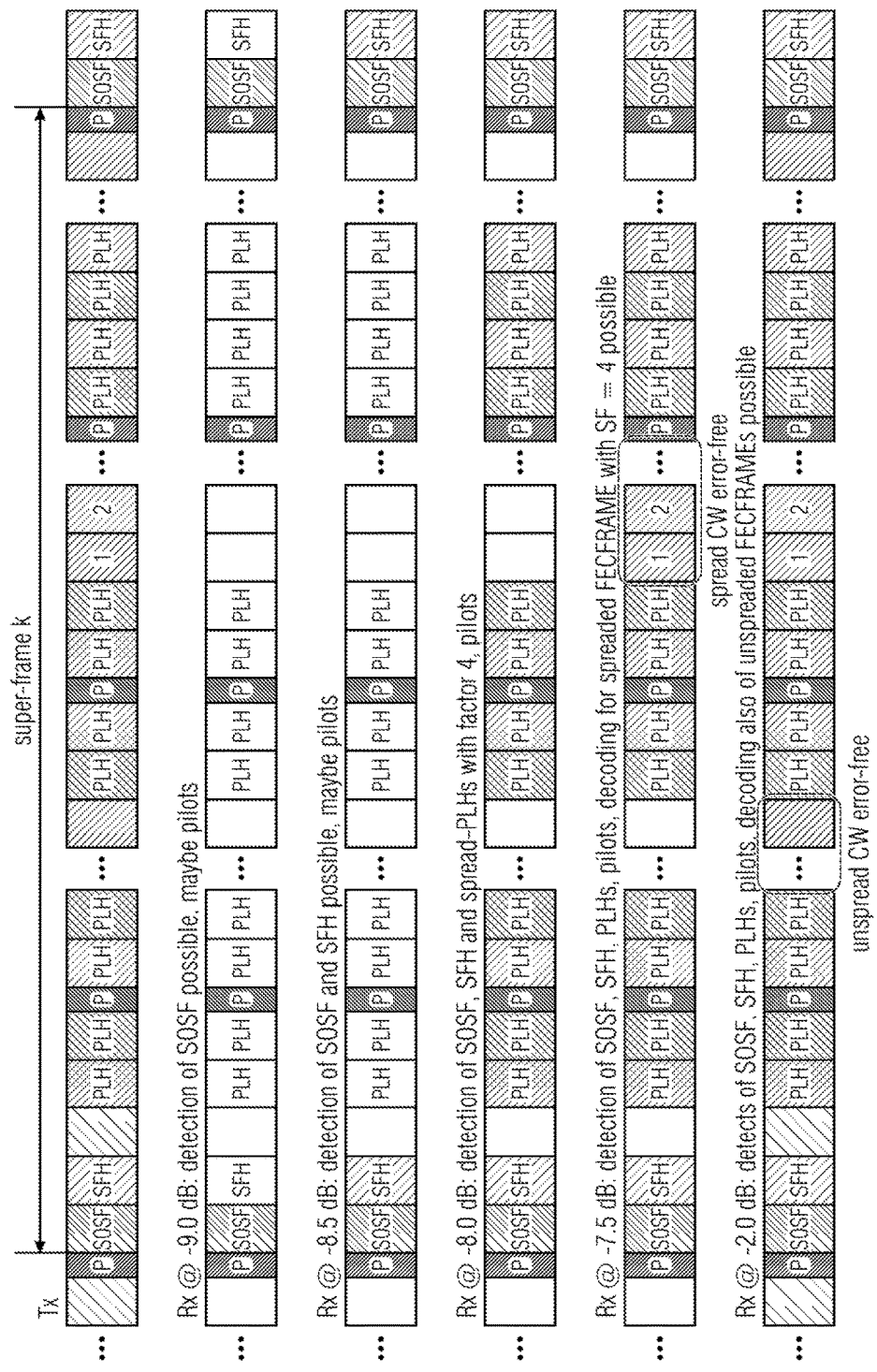
FIG. 10 schematically illustrates the effect of different values of the signal-to-noise ratio for different portions of a datastream transmitted at different protection levels.

FIG. 10 schematically illustrates the effect of different thresholds (SNR conditions) for SOSF, SFH, PLH, and XFECFRAMEs for a super-frame with spreading activated.

The upper line in FIG. 10 illustrates the super-frame as it is transmitted by a transmitter, i.e., with all headers and fields being present. The depicted super-frame k starts with the SOSF field, followed by the super-frame header SFH. Next, some remaining CUs of the last XFECFRAME are transmitted which started in the previous super-frame k−1. In this manner, the XFECFRAME spanning the boundary between the previous super-frame k−1 and the current super-frame k is completed. Then, the first frame header PLH occurs in the super-frame. In the depicted example, the frame headers PLH are spread with a spreading factor 4, i.e. the same frame header is repeated three times (four occurrences of each PLH). In the depicted embodiment, a pilot P interrupts the repetitions of the first frame header PLH between the second and third occurrences. After the first PLH, the unspread codewords CW of the corresponding first XFECFRAME are transmitted. The super-frame in the depicted example further comprises a second XFECFRAME starting with four occurrences of the frame header (spreading factor 4, as before, due to corresponding indication in the super-frame header), interrupted again by a pilot P. The second XFECFRAME comprises spread codewords (CW) 1 and 2. The super-frame continues with further XFEC-FRAMEs that contain codewords for payload data. Depending on the requirements with respect to a protection level of the payload data within a given XFECFRAME, the transmission parameters for the codewords within the given XFECFRAME are selected to provide the necessitated protection level. Note that the protection level of the corresponding frame header PLH has to be sufficiently high, too. It is recalled that the protection level for (all) the PLHs of the current super-frame header is signaled by the super-frame header. The depicted super-frame k ends with a pilot P (could be another type of data or a header, as well) which is followed by the SOSF of the subsequent super-frame k+1.

At a signal-to-noise ratio at the receiver of −9.0 dB, i.e., very bad reception conditions, the detection of the Start-Of-Super-Frame sequence is just about possible. Maybe some pilots are detectable, as well.

At a receiver SNR of −8.5 dB the situation is slightly better, because in addition to the detection of the SOSF, the super-frame header SFH can be detected and typically also be decoded. As in the above case of SNR=−9.0 dB, maybe some pilots are detectable, as well.

The next line in FIG. 10 schematically illustrates the situation for a SNR of −8.0 dB. In addition to the detectable/decodable SOSF and SFH, the spread PLHs with spreading factor 4 can be decoded.

At a SNR of −7.5 dB, decoding of spread FECFRAME with spreading factor 4 (SF=4) is possible in addition to the detection of SOSF, SFH, PLHs, and pilots. The spread codewords CW (SF=4) can be decoded substantially error-free.

The last line in FIG. 10 schematically illustrates the case SNR=−2.0 dB, i.e. fairly good reception conditions (at least as far as the signal-to-noise ratio is concerned). Now even the unspread codewords in the first FECFRAME can be decoded substantially error-free.

According to further possible aspects of the present invention, a two-stage signaling concept with two different header-types is proposed, where a first stage header determines the spreading (in possible combination with modulation order and/or code rate) of second stage headers and where the first stage header appears in a regular manner, but no restriction for the second.

According to further possible aspects of the present invention, a two-stage signaling concept is proposed, where the length of the pilot fields of the super-frame structure are related to the signaled spreading factor from the first stage header (per super-frame pilot configuration)—irrespective whether the pilots are aligned to the super-frame structure or to the PL-frame.

According to further possible aspects of the present invention, a pointer to the first PLH within the super-frame header allows the terminal to do quasi burst-processing/decoding of the payload while staying synchronized due to the constant-length super-frame.

According to further possible aspects of the present invention, a two-stage signaling concept allows to predefine different levels of "minimum protection per super-frame" which allows terminals in bad reception conditions to skip entire super-frames without losing lock on the super-frame structure (=exploiting of constant framing feature); then resynchronizing on the PLHs is achieved by using the pointer within the next (addressable by this terminal) super-frame.

According to further possible aspects of the present invention, a transmitter-side multiplexer-scheduling is proposed, which exploits this two-stage signaling for throughput enhancement.

Figure 11:
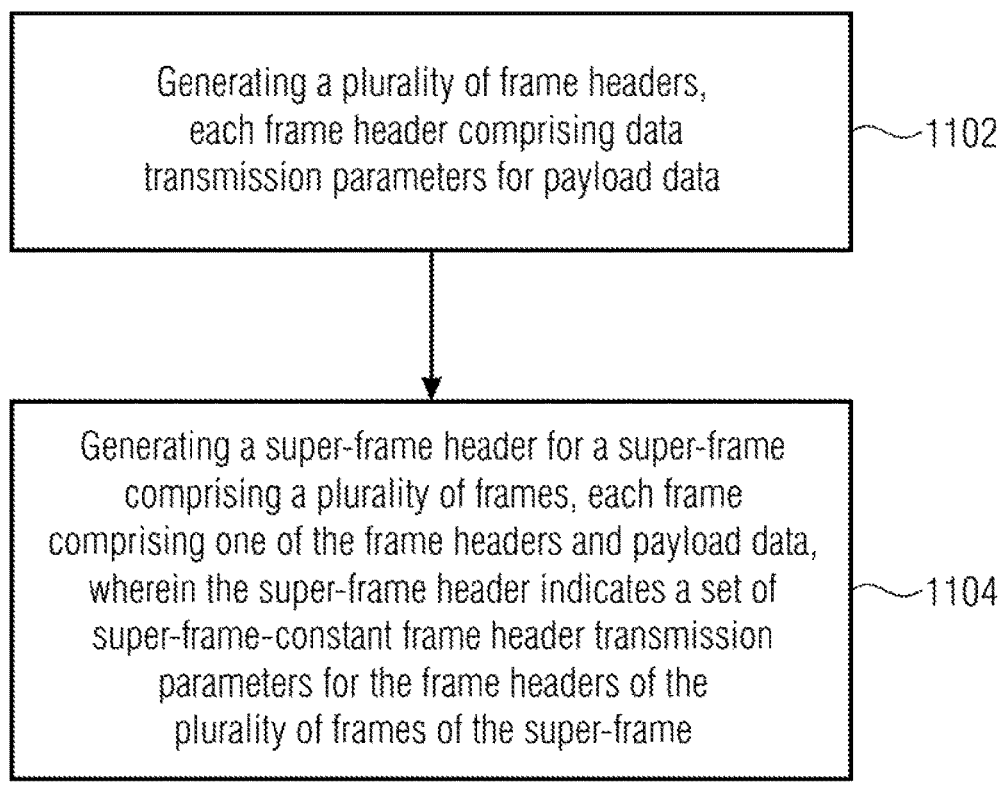
FIG. 11 shows a schematic flow diagram of a method according to at least one embodiment of the present invention.

FIG. 11 shows a schematic flow diagram of a method according to at least some embodiments of the present invention. The method may be performed at a transmitter side of a data transmission for assembling a datastream from payload data items to be transmitted. The payload data items are complemented by additional data items for providing a receiver of the datastream with information about a structure, data formats, contents, etc. of the datastream and/or the payload data items. Headers, Start-Of-Frame Indicators, and pilot are examples of such additional data items.

The method schematically illustrated in FIG. 11 comprises a step 1102 of generating a plurality of frame headers PLH, each frame header comprising data transmission parameters for payload data. The transmission parameters indicate, for example, one or more of the following: a modulation type, a code rate, a spreading factor, a selection of long code words or short code words (or more generally: a code word length), or an identifier for the payload data (such as an input stream identifier (ISI)). At least some of the transmission parameters determine a protection level for the payload data. Broadly speaking, the protection level indicates how reliably the payload data can be decoded by the receiver in a substantially error-free manner. In a satellite television broadcasting environment such as DVB-S and its successors, for example, a standard resolution television (SDTV) signal may be transmitted at a relatively high protection level, whereas the corresponding high-definition television (HDTV) signal (or the complementary data in addition to the SDTV signal) may be transmitted at a lower protection level. In this manner, a receiver in a poor reception condition (e.g., low SNR) is at least able to decode the SDTV signal, but not the HDTV signal. Another receiver (or the same receiver at another time and/or another location) that experiences better reception conditions may be able to additionally decode the HDTV signal.

The method further comprises a step 1104 of generating a super-frame header SFH for a super-frame comprising a plurality of frames. Each frame of the plurality of frames comprises one of the frame headers PLH and payload data. The super-frame header SFH indicates a set of super-frame-constant frame header transmission parameters for the frame headers of the plurality of frames of the super-frame. The super-frame-constant frame header transmission parameters indicate the transmission conditions to be applied to the frame headers within the corresponding super-frame. In this manner, the transmission conditions to be applied to the frame headers PLH can be adapted and may vary from one super-frame to another super-frame. The adaptation of the transmission conditions for the frame headers may vary between: a) high protection level and large necessitated bandwidth, and b) low protection level and small necessitated bandwidth. Any number of intermediate settings (medium protection level and medium necessitated bandwidth) are also possible.

The method may further comprise assembling the super-frame from the super-frame header SFH, the plurality of frame headers PLH, and the corresponding payload data.

The super-frame headers SFH of successive super-frames may occur in a regular pattern within a datastream generated using the method. This feature may facilitate a synchronization task to be performed by the receiver as the receiver can perform a cross-correlation of a received signal with a known pattern that is associated with each super-frame header SFH. The known pattern may be a Start-Of-Super-Frame (SOSF) field that precedes the super-frame header. The SOSF could also be considered to be a part of the super-frame header SFH, or the SOSF and the SFH may have a relative position to each other (e.g., a distance counted in capacity units) that is known to both the transmitter and the receiver. By exploiting the regular pattern of the SFH and/or the SOSF, the receiver can more easily track the datastream and the transitions between the super-frames.

The method may further comprise a step of sorting payload data items to a plurality of super-frames depending on a necessitated level of transmission robustness of the payload data item. Each of the plurality of super-frames targeted by the sorting action contains payload data items having at most the necessitated level of transmission robustness. In other words, the super-frame may contain payload data items that have a protection level equal to or lower than the protection level that is intended for the frame headers of the contemplated super-frame. The rationale is that a payload data item necessitating a lower protection level is still decodable at the receiver end (even better decodable than originally intended). The tradeoff is that this low protection level data item then necessitates more overhead than originally intended, which may nevertheless be acceptable. On the other hand, a payload data item having a higher necessitated protection level than defined by the super-frame-constant frame header transmission parameters might not be decodable at the receiver side, because the receiver, when being in fairly bad reception conditions, may not be able to find and/or decode the corresponding frame header. In this embodiment(s), the method may further comprise a step of selecting the super-frame-constant frame header transmission parameters for the plurality super-frames on the basis of the necessitated level of transmission robustness for the payload data items contained in the super-frame.

The super-frame header SFH may further comprises a pointer to a first frame header PLH of the super-frame to assist the receiver in finding the frame headers once the super-frame header has been found. Indeed, the distance between the super-frame header SFH and the first frame header PLH may vary so that for each new super-frame a new indication of the position of the first frame header within the PLH is useful. According to some embodiments, a frame may start in a preceding super-frame and span the transition from this preceding super-frame to the current super-frame, i.e., the frames are not necessarily aligned with the super-frames.

The super-frame header SFH may be transmitted using transmission parameters providing a transmission robustness at least as high as a highest necessitated level transmission robustness for the payload data.

Figure 12:
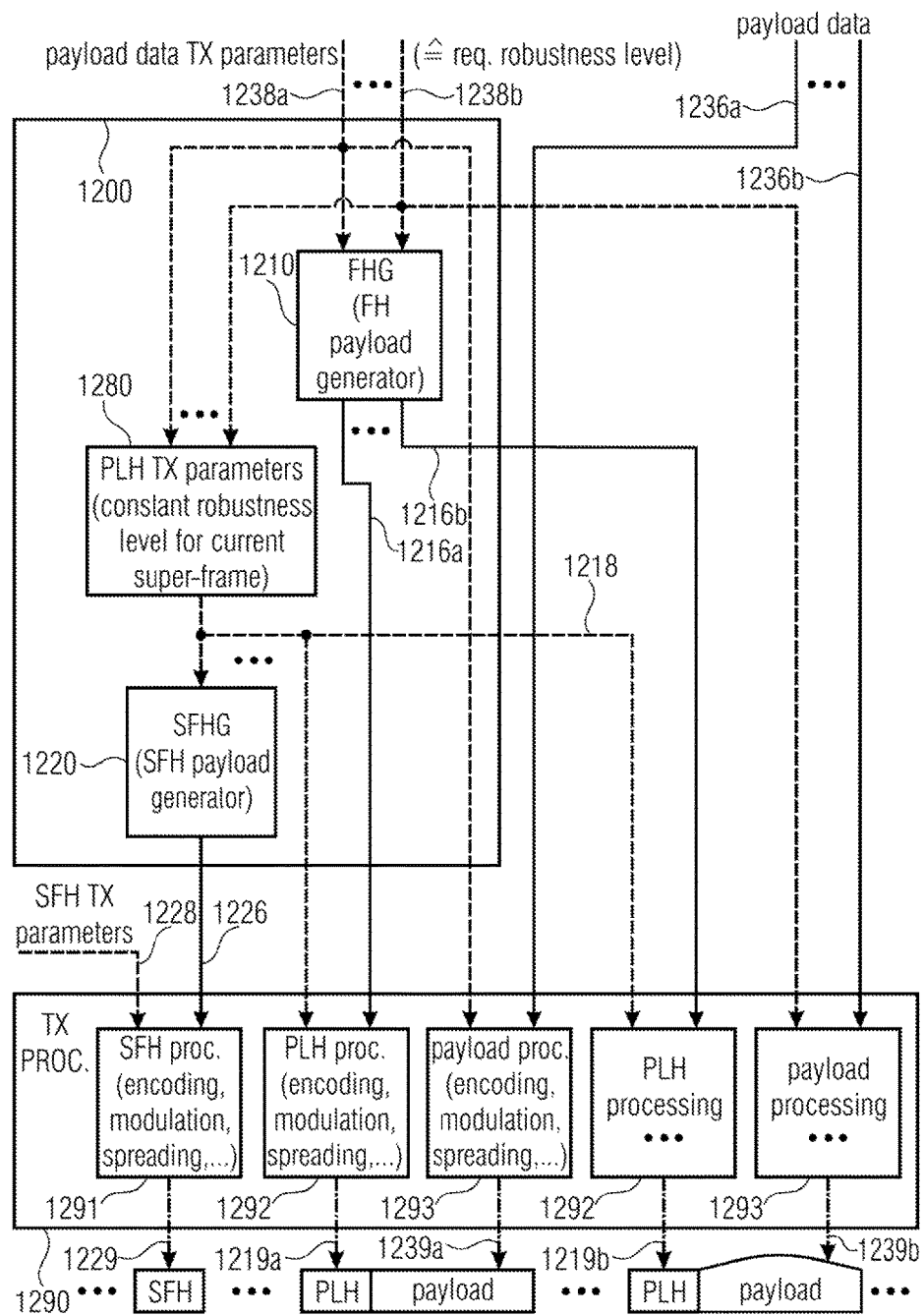
FIG. 12 shows a schematic block diagram of an apparatus according to at least some embodiments of the present invention.

FIG. 12 shows a schematic block diagram of a transmitter comprising an apparatus 1200 for assembling a datastream according to at least some embodiments of the present invention. The apparatus 1200 comprises a frame header generator (FHG) 1210 configured to generate a plurality of frame headers PLH, in particular the frame header payload, i.e., the signaling data to be transmitted within the frame header PLH. Accordingly, the FHG 1210 may also be regarded as a frame header payload generator. Each frame header PLH comprises data transmission parameters 1238a, 1238b for payload data 1236a, 1236b. The payload data 1236a, 1236b and the data transmission parameters 1238a, 1238b are typically related to each other, i.e., the data transmission parameters 1238a, 1238b are typically a function of the necessitated protection level (necessitated robustness level) of the data.

In the schematic illustration of FIG. 12 the data transmission parameters 1238a, 1238b are provided to the frame header generator 1210 which formats them into a suitable format for inclusion in the datastream and inserts the formatted data transmission parameters 1216a, 1216b as corresponding frame header signals 1219a, 1219b in the frame headers PLH using a transmit processing (TX PROC) 1290, e.g. a transmitter chain. In order to facilitate the understanding of FIG. 12, the transmit processing 1290 is shown as comprising several subsystems: a SFH processing block 1291, a PLH processing block 1292, and a payload processing block 1293. Nevertheless, these blocks 1291-1293 may correspond to a single physical entity which is, for example, time-multiplexed in order to process the super-frame header SFH, the frame headers PLHs, and the frames containing the actual payload data at different points in time, i.e., the same entity may be used multiple times.

In FIG. 12 and subsequent schematic block diagrams full stroke arrows indicate data to be inserted into or extracted from the datastream. Dashed arrows indicate transmission parameters which control the transmit processing 1290 or, in the case of FIG. 15, a configurable receiver circuit 1590 to apply the signaled transmission parameters for transmission or reception of the data encoded within the corresponding portion of the datastream. A pair of neighboring full stroke and dashed arrows entering or leaving the transmit processing 1290 depict the data to be transmitted (full stroke arrow) and the corresponding transmission parameters (dashed arrow). Note that the transmit processing 1290 may process the various pairs of data and transmission parameters at different points in time so that the resulting transmission signals are inserted at the intended time instants into the overall signal corresponding to the datastream. To facilitate the understanding of FIG. 12, but by no means limiting the scope or excluding other possible implementations, the reader may assume that the data/transmission parameter pairs are processed in a temporal order from left to right and inserted in this order into the datastream.

The apparatus 1200 also comprises an transmission parameter mapper 1280 configured to receive the data transmission parameters 1238a, 1238b and to determine the frame header transmission parameter(s) 1218 on the basis of the data transmission parameters 1238a, 1238b. The transmission parameter mapper 1280 can thus control the robustness/protection level that is applied to the frame headers in the current super-frame as a function of the robustness/protection level defined for and/or necessitated by the payload data. The determined frame header transmission parameter(s) 1218 is provided to the super-frame header generator 1220 and also to the transmit processing 1290, more particularly to the PLH processing block 1292 in order to control the transmission of the frame headers according to the frame header transmission parameter(s) 1218 that are valid for the current super-frame.

When processing the formatted data transmission parameters 1216a, 1216b, the transmit processing 1290 applies super-frame-constant frame header transmission parameters (PLH TX PARAMS) 1218 when inserting the formatted data transmission parameters 1216a, 1216b at the intended time instant as a frame header into the datastream. In the case of the frame headers PLH, the PLH processing block 1292 may be configured to perform at least one of encoding, modulation, and spreading of the formatted data transmission parameters 1216a, 1216b, using the frame header transmission parameter(s) 1218. Subsequently, data signals 1239a, 1239b are generated by the transmit processing 1290 on the basis of the payload data 1236a, 1236b and the corresponding data transmission parameters 1238a, 1238b and inserted in the datastream signal.

The apparatus 1200 further comprises a super-frame header generator (SFHG) 1220 configured to generate a super-frame header SFH for a super-frame comprising a plurality of frames. The super-frame header generator 1220 may also be regarded as a super-frame header payload generator, since it generates the data to be transmitted within the super-frame. Each frame comprises one of the frame headers PLH and payload data 1236a, 1236b. The super-frame header SFH receives and processes a set of super-frame-constant frame header transmission parameters 1218 for the frame headers PLH of the plurality of frames of the super-frame. The set may comprise a single parameter or several parameters, such as modulation, code rate, spreading, etc. The super-frame header SFH comprises super-frame header data 1226 which is processed by the transmit processing 1290 according to super-frame header transmission parameters (SFH TX PARAMS) 1228 to generate a corresponding signal portion 1229 of the overall transmit signal for the datastream. The super-frame header transmission parameters 1228 are typically constant and define a relatively high protection level so that the super-frame headers SFH can be detected and possibly decoded even under fairly bad reception conditions. The SFH processing block 1291 may perform at least one of encoding, modulation, and spreading on the super-frame data 1226, as defined by the SFH transmission parameter(s) 1228, i.e. by the necessitated robustness/protection level for the super-frame header.

Figure 13A:
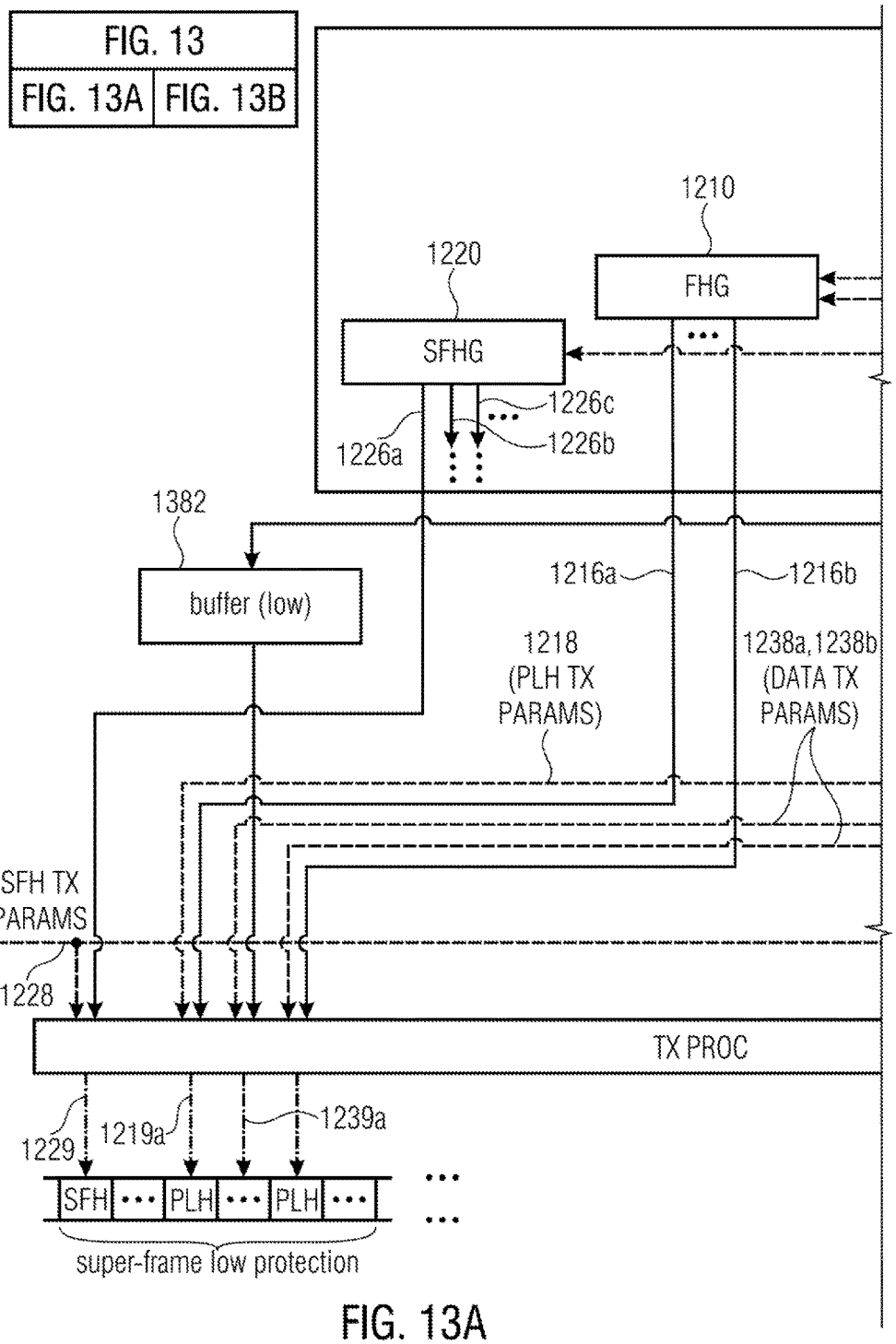
FIG. 13A and FIG. 13B show a schematic block diagram of an apparatus according to at least some further embodiments of the present invention.
Figure 13B:
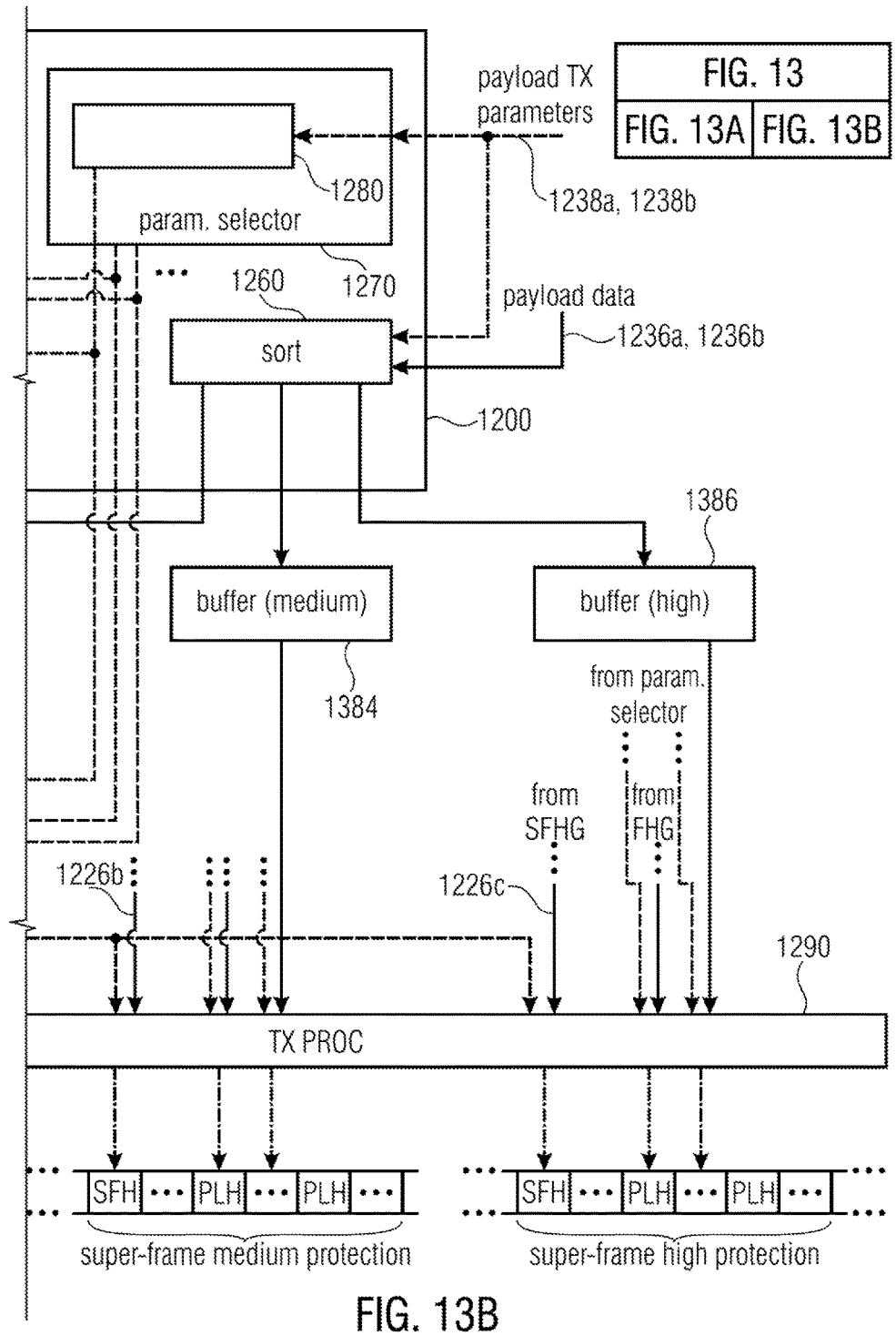

FIG. 13A and FIG. 13B show a schematic block diagram of a transmitter comprising an apparatus 1200 for assembling a datastream according to a further possible embodiment of the present invention. The apparatus 1200 in FIG. 13A and FIG. 13B additionally comprises a a payload sorter 1260 configured to sort payload data items to a plurality of super-frames depending on a necessitated level of transmission robustness of the payload data item so that each of the plurality of super-frames contains payload data items having the necessitated level of transmission robustness or a lower level of transmission robustness. The super-frame data for the three different super-frames are labelled 1226a, 1226b, 1226c.

The apparatus 1200 further comprises a parameter selector 1270 configured to select the super-frame-constant frame header transmission parameters 1218 for the plurality super-frames on the basis of the necessitated level of transmission robustness for the payload data items contained in the super-frame. The transmitter may comprise buffers 1382, 1384, 1386 for buffering sorted payload data items with low, medium, and high protection levels, respectively. The content of the various buffers 1382, 1384, 1386 may then be inserted into different super-frames. Note that the super-frame intended for payload data necessitating a high protection level may accept payload data with medium or low protection level. This may be useful if the super-frame is scheduled for transmission but there is not enough payload data available to entirely fill the super-frame intended for payload data necessitating the high protection level. In this case, payload data from the two other buffers 1382, 1384 may be inserted in the highly protected super-frame. The only tradeoff that has to be accepted is that the frame headers for the frames containing the low or medium protected data are transmitted at a higher protection level than actually needed.

The parameter selector 1270 is configured to provide the super-frame-constant frame header transmission parameters 1218 and the data transmission parameters 1238a, 1238b. The parameter selector 1270 may be controlled by a signal that indicates which super-frame (low/medium/high protection) is to be transmitted next. Using a look-up table or configuration data, the parameter selector 1270 may select the transmission parameters 1218, 1238a, 1238b depending on the desired protection level.

Figure 14:
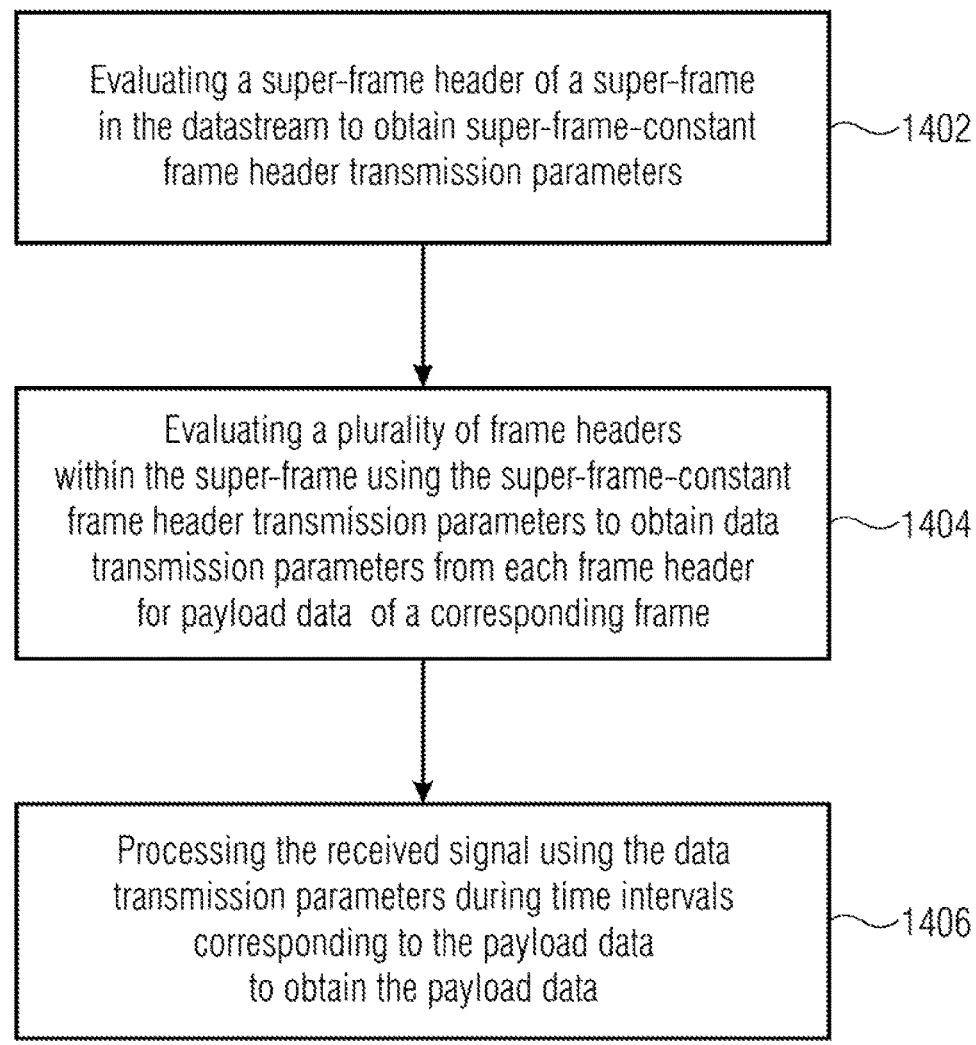
FIG. 14 shows a schematic flow diagram of a method for processing a received signal according to at least some further embodiments of the present invention.

FIG. 14 shows a schematic flow diagram of a method for processing a received signal corresponding to a datastream. The method comprises a step 1402 of evaluating a super-frame header SFH of a super-frame in the datastream to obtain super-frame-constant frame header transmission parameters 1218. A plurality of frame headers PLH within the super-frame are then evaluated using the super-frame-constant frame header transmission parameters 1218 to obtain data transmission parameters 1238a, 1238b from each frame header for payload data 1236a, 1236b of a corresponding frame. The method further comprises a step 1406 of processing the received signal using the data transmission parameters 1238a, 1238b during time intervals corresponding to the payload data to obtain the payload data 1236a, 1236b.

In addition, the method for processing the received signal may comprise a step of tracking a plurality of super-frame headers SFH by exploiting a regular pattern in which the super-frame headers SFH occur in the received signal.

Figure 15:
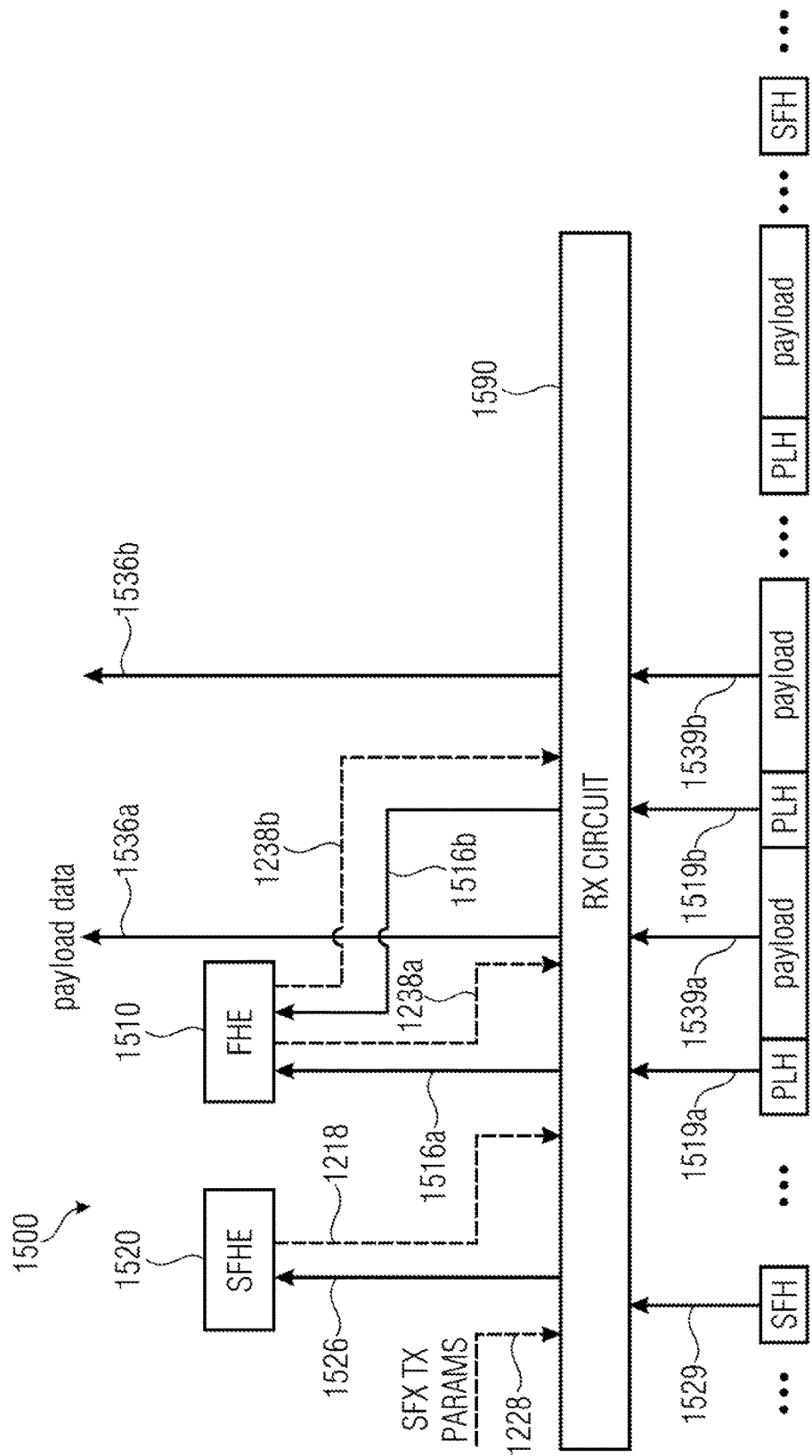
FIG. 15 shows a schematic block diagram of a receiver according to at least some further embodiments of the present invention.

FIG. 15 shows a schematic block diagram of a receiver 1500 comprising a super-frame header evaluator 1520 configured to evaluate a super-frame header SFH of a super-frame in a datastream. The datastream is typically received at the receiver 1500 in the form of a received signal with a relatively low SNR. The received signal needs to be demodulated and possibly de-spreaded for which knowledge of the corresponding modulation and, if applicable, the corresponding spreading factor is needed. For the super-frame header SFH, these parameters may be pre-defined. The evaluation performed by the super-frame header evaluator 1520 typically serves the goal of detecting the super-frame header within the received signal and obtaining super-frame-constant frame header transmission parameters 1218. The receiver 1500 further comprises a frame header evaluator 1510 configured to evaluate a plurality of frame headers PLH within the super-frame using the super-frame-constant frame header transmission parameters 1218 to obtain data transmission parameters 1238a, 1238b from each frame header PLH for payload data 1536a, 1536b of a corresponding frame. The receiver also comprises a configurable receiver circuit 1590 configured to process the received signal using the data transmission parameters 1238a, 1238b during time intervals corresponding to the payload data to obtain the payload data 1536a, 1536b.

The configurable receiver circuit 1590 may receive various (temporal) portions of the signal representing the datastream. A first signal portion 1529 corresponds to the super-frame header SFH and can be detected by the configurable receiver circuit 1590 and possibly decoded using the super-frame header transmission parameters 1228 which are known to the receiver. The decoded SFH signal 1526 is fed to the super-frame evaluator 1520 in order to extract the super-frame-constant frame header transmission parameters 1218 from the received super-frame header. As explained above, the super-frame header transmission parameters 1228 are typically chosen in a way that the super-frame headers can be detected and possibly decoded even in relatively poor reception conditions (for example, at signal-to-noise ratios as low as −8.5 dB).

Using the super-frame-constant frame header transmission parameters 1218, the configurable receiver circuit 1590 may now be capable of decoding the frame headers PLH in the super-frame by processing the corresponding signal portions 1519a, 1519b. The resulting decoded frame header signals 1516a, 1516b are provided to the frame header evaluator 1510. The frame header evaluator 1510 outputs corresponding data transmission parameters 1238a, 1238b that are again fed to the configurable receiver circuit 1590 for decoding the payload data 1536a, 1536b.

The receiver 1500 may further comprise a super-frame header tracker configured to track a plurality of super-frames SFH by exploiting a regular pattern in which the super-frame headers SFH occur in the received signal.

Figure 16:
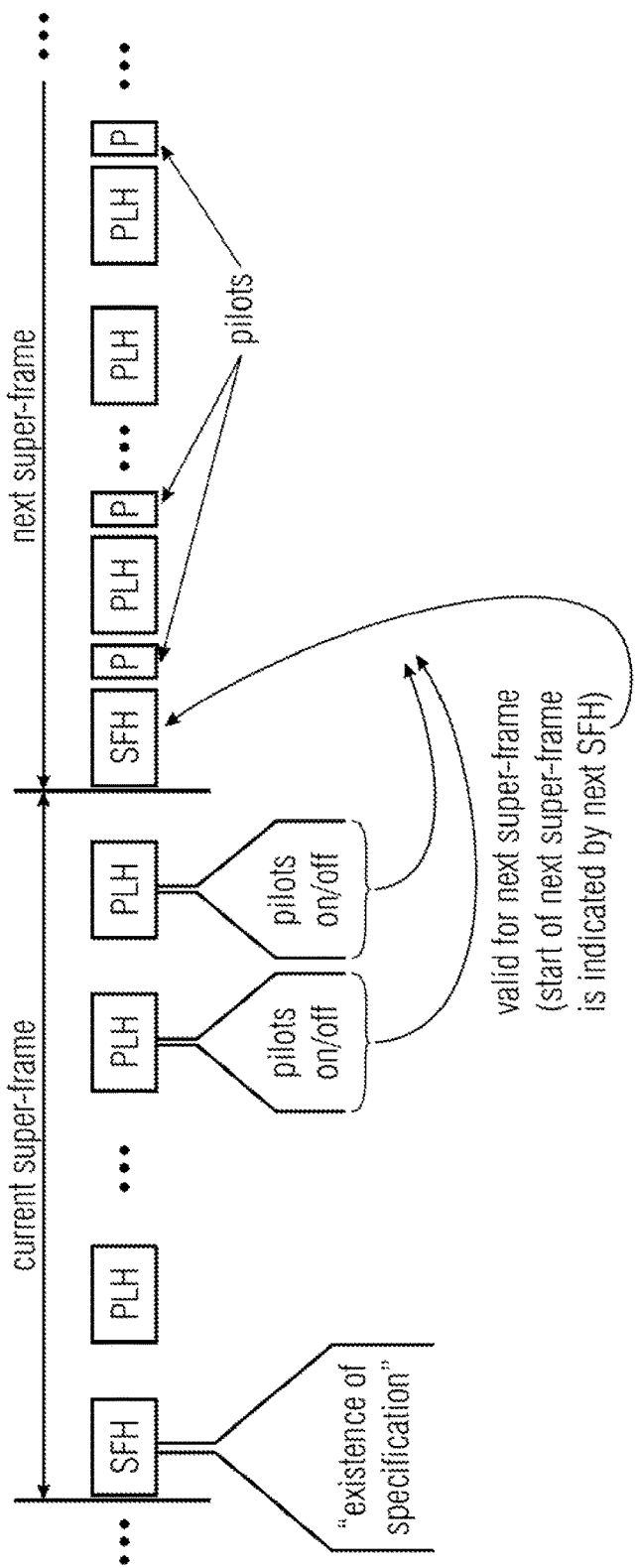
FIG. 16 schematically illustrates a datastream in which super frame headers are used to indicate a format and/or syntax for upcoming frame headers, and in which the super frame headers also indicate the end of one super frame and the start of the subsequent super frame.

FIG. 16 schematically illustrates a datastream with super frame headers SFH that are used to signal a format or syntax of upcoming frame headers PLH. In particular, FIG. 16 schematically shows two super frames of the datastream, a current super frame and a next super frame (subsequent super frame). In an attempt to reduce FIG. 16 to the elements that are most relevant for explaining the corresponding implementation example, no frames and no payload data is shown in FIG. 16

For example, a datastream may comprise a plurality of super-frames, each super-frame comprising, a super-frame header SFH, and a plurality of frames, each frame comprising a frame header PLH and payload data, wherein the super-frame header SFH indicates a frame header format for at least one of the frame headers of the plurality of frames PLH.

The start of each super frame is indicated by a super frame header SFH or a specific pattern SOSF (start-of-super-frame), as the case may be. The SOSF may also be considered as a part of the super frame header SFH. Each super frame comprises a plurality of frames and, consequently, a plurality of frame headers PLH indicating the data transmission parameters for the payload data in the corresponding frame.

The frame headers PLH may or may not be subject to varying transmission parameters, that may change from one super frame to another super frame and that may be signalled by the super frame header SFH of the corresponding super frame. However, according to the implementation example according to FIG. 16, the super frame header SFH indicates a certain frame header format for frame headers PLH that are scheduled for transmission in the future.

For example, the frame header(s) may signal transmission parameters that are constant and valid over the entire super frame, for example super-frame-pilots ON/OFF. However, if such a signalling shall be executed for the next super frame in FIG. 16, then at least one frame header PLH within the current super frame already has to contain these super frame constant parameters so that this signalling information can be executed as soon as the next super frame begins. In FIG. 16, there are two frame headers PLH within the current super frame (the last two frame header PLH in this super frame) that indicate the super-frame-constant transmission parameter super-frame-pilots ON/OFF for the next super frame. As depicted in FIG. 16, a portion of the two considered frame headers PLH is dedicated to the signalling of the pilots ON/OFF parameter for the next super frame. However, the transmission parameter for the next super frame is only activated when the next super frame actually begins, which is indicated by the super frame header SFH of the next super frame. In case several frame headers PLH in the current super frame indicate the transmission parameter(s) that shall be valid in the next super frame, a receiver has several opportunities to correctly receive at least one of these frame headers PLH and to prepare itself to switch to another reception mode as soon as the next super frame begins, which is indicated by the super frame header SFH of the next super frame.

As mentioned above, the super frame header SFH may have the function to indicate to the receivers when a new super frame begins. In addition, the super frame header SFH may also indicate the format or syntax for the frame headers PLH. In particular, the super frame header may indicate whether the next frame headers do contain and specify super frame-constant transmission parameters that a receiver would be necessitated to take into account in order to assure continued reception. In FIG. 16, the left super frame header SFH comprises a field labelled "existence of specification" which may assume the values "true" or "false". The value of this "existence of specification" field indicates whether the following frame headers PLH have a particular format and/or syntax that a receiver would have to take into account, for example an information regarding whether pilots are ON or OFF in the next super frame. The format and/or syntax signalisation for the frame headers PLH is valid until further notice in a later super frame header. Note that although the super frame header SFH of the current super frame may signal the "existence of the specification" already, this does not yet determine whether pilots are ON or OFF during the entire next super frame. Rather, the transmitter may decide at a later point in time whether pilots should be ON or OFF in an upcoming super frame, as long as there are enough frame headers PLH left in the current super frame to guarantee a reliable reception and interpretation at the receivers (or at least a portion of the receivers that should be, in principle, capable of receiving and decoding the frame headers PLH of the current super frame.

The background or rationale for the concept according to FIG. 16 is that the super frame header SFH here only has to signal the existence of the specification (for the frame headers PLH) and because for reasons of compatibility there was space available in the frame headers for this kind of signalling, anyway.

According to related aspects, the frame header format may indicate that at least one frame header specifies at least one super-frame constant transmission parameter for a subsequent super frame. A start of the subsequent super-frame may be indicated by a subsequent super-frame header where said super-frame constant transmission parameter becomes valid.

Further aspects may have the frame header format to define a frame header content of the at least one frame header. The frame header content may then comprise the data transmission parameters and at least one super-frame constant transmission parameter for a subsequent super-frame.

The concept schematically illustrated in FIG. 16 may be implemented as method or as an apparatus at a transmitter side, or as a method or an apparatus at a receiver side. For example, an apparatus for assembling a datastream may comprise a frame header generator configured to generate a plurality of frame headers PLH. Each frame header PLH may comprise data transmission parameters for payload data. The apparatus may further comprise a super-frame header generator configured to generate a super-frame header SFH for a super-frame comprising a plurality of frames, each frame comprising one of the frame headers PLH and payload data, wherein the super-frame header SFH indicates a frame header format for at least one of the frame headers PLH of the plurality of frames of the super-frame.

It is also possible to implement the concept of FIG. 16 as a method for processing a received signal corresponding to a datastream. Such method may comprise evaluating a super-frame header SFH of a super-frame in the datastream to obtain a frame header format for at least one frame header of a plurality of frame headers of the super-frame. A plurality of frame headers PLH may then be evaluated within the super-frame using the frame header format to obtain data transmission parameters from each frame header for payload data of a corresponding frame as well as super-frame constant transmission parameters. The method may also comprise processing the received signal using the data transmission parameters during time intervals corresponding to the payload data to obtain the payload data.

A corresponding receiver along the lines of FIG. 16 may comprise a super-frame header evaluator configured to evaluate a super-frame header SFH of a super-frame in a datastream received at the receiver to obtain a frame header format for at least one frame header of the plurality of frame headers of the super-frame. The receiver may further comprise a frame header evaluator configured to evaluate a plurality of frame headers PLH within the super-frame using the frame header format to obtain data transmission parameters from each frame header (PLH) for payload data of a corresponding frame as well as super-frame constant transmission parameters. A configurable receiver circuit may be configured to process the received signal using the data transmission parameters during time intervals corresponding to the payload data to obtain the payload data.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Physical Layer of the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are necessitated performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Digital Video Broadcasting (DVB), "DVB-S2 Standard, ETSI EN 302 307 V1.3.1," 2012-11.
[2] Digital Video Broadcasting (DVB), "DVB-SH Standard, ETSI EN 302 583 V1.1.1," 2008-03.
[3] Digital Video Broadcasting (DVB), "DVB-T2 Standard, ETSI EN 302 755 V1.3.1," 2012-04.
[4] Digital Video Broadcasting (DVB), "DVB-RCS2 Standard Part 2, ETSI EN 301 545-2 V1.1.1," 2011-08.
[5] Digital Video Broadcasting (DVB), "DVB-RCS2 Guidelines for Implementation and Use of LLS: EN 301 545-2, ETSI TR 101 xx V1.x.x," 2012-12.
[6] Digital Video Broadcasting (DVB), "Interaction channel for satellite distribution systems, ETSI EN 301 790 V1.5.1," 2009-05.
[7] DVB-S2 Technical Module, "Call for Technologies (CfT) for Evolutionary Subsystems of the S2 System, TM-S20122r1," 2012-12-13.
[8] ETRI (Electronics & Telecommunications Research Institute), "Response to call for technology for DVB-Sx standard: Low SNR operation, TM-520134," DVB-S2 Technical Module, 2013-02-12.
[9] Hughes, "Response to call for technology for DVB-Sx standard: Hughes Network Systems, TM-520152," DVB-S2 Technical Module, 2013-02-12.
[10] iDirect, "Response to call for technology for DVB-Sx standard: Operation of DVB-Sx at Very Low SNR by Custom Frames, TM-520136," DVB-S2 Technical Module, 2013-02-12.
[11] Newtec, "Response to call for technology for DVB-Sx standard: Newtec proposal, TM-S20141," DVB-S2 Technical Module, 2013-02-12.
[12] Rai (Centro Ricerche e Innovazione Tecnologica), "Response to call for technology for DVB-Sx standard: Constant framing in very low SNR conditions, TM-S20149," DVB-S2 Technical Module, 2013-02-12.
[13] Sony Corporation, "Response to call for technology for DVB-Sx standard: Low SNR Link Proposal, TM-520146," DVB-S2 Technical Module, 2013-02-12.
[14] TAS (Thales Alenia Space), "Response to call for technology for DVB-Sx standard: DVB-Sx CfT, TM-520147," DVB-S2 Technical Module, 2013-02-12.
[15] Samsung Electronics CO LTD, "A telecommunication method for controlling a data uplink channel". Patent Application GB 2416963 A
[16] WESTERN ELECTRIC CO und BELL TELEPHONE LABOR INC, "Digital signaling on a pulse code modulation transmission system". U.S. Pat. No. 3,922,495 A
[17] HRL LAB LLC, KONYLIS GEORGE, RYU BONG und RYU BONG K, "Method and apparatus for adaptive bandwidth reservation in wireless ad-hoc networks" US 2003/012176 A
[18] 2011 INTELLECTUAL PROPERTY ASSET TRUST, NOKIA CORP, NOKIA INC und NOKIA MOBILE PHONES LTD, "Method and apparatus for controlling transmission of packets in a wireless communication system". US 2003/039230 A

[19] MITSUBISHI ELECTRIC INF TECH, "Method for transmitting and retrieving an additional information in a data frame". EP 1317093 A
[20] WANG DAQING, YUAM CHEN und NOKIA CORP, "Method and device for downlink packet access signaling for time division duplex (tdd) mode of a wireless communication system". US 2005/117553 A
[21] INTEL CORP, LI GUANGJIE und WU XIAOXIN, "HYBRID, MULTIPLE CHANNEL, AND TWO-STEP CHANNEL QUALITY INDICATOR (CQI) FEEDBACK SCHEMES" US 2010/035644 A
[22] DU LEI, HUANG MIN, NOKIA SIEMENS NETWORKS OY und TENG YONG, "Discontinuous Reception in Carrier Aggregation Wireless Communication Systems". US 2011/267957 A

The invention claimed is:

1. Method comprising:
generating a plurality of frame headers, each frame header comprising data transmission parameters for payload data; and
generating a super-frame header for a super-frame comprising a plurality of frames, each frame comprising one of the frame headers and payload data, wherein the super-frame header indicates a set of super-frame-constant frame header transmission parameters for the frame headers of the plurality of frames of the super-frame,
sorting payload data items to a plurality of super-frames having different protection levels depending on a necessitated level of transmission robustness of the payload data item so that each of the plurality of super-frames comprises payload data items having the necessitated level of transmission robustness or a lower level of transmission robustness; and
selecting the super-frame-constant frame header transmission parameters for the plurality of super-frames on the basis of the necessitated level of transmission robustness for the payload data items comprised in the super-frame,
wherein the super-frame header indicates whether a plurality of pilot data fields are to be inserted into the corresponding super-frame and each frame header further specifies whether and in which manner the corresponding frame comprises at least one of the plurality of pilot data fields.

2. Method according to claim 1, wherein the super-frame header indicates whether spreading is to be applied within the corresponding super-frame.

3. Method according to claim 1, wherein the super-frame headers of successive super-frames occur in a regular pattern within a datastream generated using the method.

4. Method according to claim 1, wherein the super-frame header further comprises a pointer to a first frame header of the super-frame.

5. Method according to claim 1, wherein the super-frame header is transmitted using transmission parameters providing a transmission robustness at least as high as a highest necessitated level transmission robustness for the payload data.

6. Method according to claim 1, wherein the super-frame header is placed within at least one dummy frame defined by a predecessor transmission standard so that the super-frame header can be ignored by devices operating under the predecessor standard.

7. Method according to claim 6, wherein the frame headers and the payload data have a necessitated level of transmission robustness higher than provided for by the predecessor standard and are placed within at least one dummy frame defined by the predecessor standard.

8. Method according to claim 1, wherein the super-frame header indicates the set of super-frame-constant frame header transmission parameters in the form of a parameter set ID corresponding to a specific parameter set among a plurality of parameter sets, wherein each of the parameter sets defines a combination of parameter values for several super-frame-constant frame header transmission parameters.

9. Method according to claim 8, wherein each parameter set ID refers to parameter-set-individual rules for the super-frame and for payload-frame structuring.

10. Apparatus for assembling a datastream, the apparatus comprising:
a frame header generator configured to generate a plurality of frame headers, each frame header comprising data transmission parameters for payload data;
a super-frame header generator configured to generate a super-frame header for a super-frame comprising a plurality of frames, each frame comprising one of the frame headers and payload data, wherein the super-frame header indicates a set of super-frame-constant frame header transmission parameters for the frame headers of the plurality of frames of the super-frame;
a payload sorter configured to sort payload data items to a plurality of super-frames having different protection levels depending on a necessitated level of transmission robustness of the payload data item so that each of the plurality of super-frames comprises payload data items having the necessitated level of transmission robustness or a lower level of transmission robustness; and
a parameter selector configured to select the super-frame-constant frame header transmission parameters for the plurality of super-frames on the basis of the necessitated level of transmission robustness for the payload data items comprised in the super-frame,
wherein the super-frame header indicates whether a plurality of pilot data fields are to be inserted into the corresponding super-frame and each frame header further specifies whether and in which manner the corresponding frame comprises at least one of the plurality of pilot data fields.

11. Apparatus according to claim 10, wherein the super-frame header indicates the set of super-frame-constant frame header transmission parameters in the form of a parameter set ID corresponding to a specific parameter set among a plurality of parameter sets, wherein each of the parameter sets defines a combination of parameter values for several super-frame-constant frame header transmission parameters.

12. Apparatus according to claim 11, wherein each parameter set ID refers to parameter-set-individual rules for the super-frame and for payload-frame structuring.

* * * * *

UNITED STATES PATENT AND TRADEMARK OFFICE
CERTIFICATE OF CORRECTION

PATENT NO. : 10,057,013 B2
APPLICATION NO. : 14/859679
DATED : August 21, 2018
INVENTOR(S) : Stadali et al.

Page 1 of 1

It is certified that error appears in the above-identified patent and that said Letters Patent is hereby corrected as shown below:

On the Title Page

Item [72], change "Holger Stadali; Nuremberg (DE);" to -- Holger Stadali; Erlangen (DE); --

Signed and Sealed this
Twenty-seventh Day of August, 2019

Andrei Iancu
*Director of the United States Patent and Trademark Office*